US012338945B2

(12) United States Patent
Ophardt et al.

(10) Patent No.: US 12,338,945 B2
(45) Date of Patent: *Jun. 24, 2025

(54) FREE STANDING STAND

(71) Applicant: OP-Hygiene IP GmbH, Niederbipp (CH)

(72) Inventors: Hendrik Ophardt, Vineland (CA); Heiner Ophardt, Arisdorf (CH)

(73) Assignee: OP-HYGIENE IP GMBH, Niederbipp (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,836

(22) Filed: Mar. 13, 2024

(65) Prior Publication Data

US 2024/0218964 A1    Jul. 4, 2024

Related U.S. Application Data

(63) Continuation of application No. 17/241,606, filed on Apr. 27, 2021, now Pat. No. 11,971,132.

(30) Foreign Application Priority Data

Apr. 28, 2020   (CA) ................................. CA 3078207

(51) Int. Cl.
*F16M 11/22*     (2006.01)
*A47K 5/12*     (2006.01)

(52) U.S. Cl.
CPC .......... *F16M 11/22* (2013.01); *A47K 5/1211* (2013.01); *F16M 2200/04* (2013.01); *F16M 2200/08* (2013.01)

(58) Field of Classification Search
CPC ...... B67D 3/00; B67D 3/0029; B67D 3/0032; B67D 3/0035; F16M 11/22; F16M 2200/04; F16M 2200/08; A47K 5/1211
See application file for complete search history.

(56) References Cited

U.S. PATENT DOCUMENTS

| | | | |
|---|---|---|---|
| 4,087,022 A | * | 5/1978 | Zanetti-Streccia .... B65D 83/30 222/402.13 |
| 5,507,414 A | | 4/1996 | Ong |
| D671,346 S | | 11/2012 | Zlatic et al. |
| D735,487 S | | 8/2015 | Morino |
| 9,756,989 B2 | | 9/2017 | Ophardt et al. |
| D818,739 S | | 5/2018 | Buell et al. |
| 11,519,163 B2 | | 12/2022 | Braxton |
| 2006/0041197 A1 | | 2/2006 | Ophardt |
| 2012/0187146 A1 | | 7/2012 | Chopra |

(Continued)

FOREIGN PATENT DOCUMENTS

EP     3650128     5/2020

*Primary Examiner* — Vishal Pancholi
*Assistant Examiner* — Robert K Nichols, II
(74) *Attorney, Agent, or Firm* — Thorpe North & Western, LLP

(57) ABSTRACT

A free standing support stand adapted to be supported on a horizontal floor. The stand having a lower end floor engaging surfaces to engage the floor. The stand including a coupling member adapted to couple a fragile element to the stand spaced from the lower end of the stand. The stand including a fall arrest bumper member spaced upwardly from the lower end to engage with the floor to reduce damage to the fragile element from any impact with the floor should the stand be tipped over.

20 Claims, 22 Drawing Sheets

(56) References Cited

U.S. PATENT DOCUMENTS

| | | |
|---|---|---|
| 2014/0190994 A1 | 7/2014 | Everard et al. |
| 2015/0108306 A1 | 4/2015 | Chuang |
| 2015/0313422 A1 | 11/2015 | Ophardt et al. |
| 2018/0015489 A1 | 1/2018 | Ophardt et al. |
| 2018/0153354 A1* | 6/2018 | Beckerman ......... B05B 11/0054 |

* cited by examiner

FREE STANDING STAND

PRIORITY CLAIM

This application is a continuation of U.S. patent application Ser. No. 17/241,606, filed Apr. 27, 2021, which claims priority to Canadian Patent Application No. 3078207, filed Apr. 28, 2020, each of which are incorporated herein by reference.

SCOPE OF THE INVENTION

This invention relates to a floor supported free standing fluid dispenser assembly and, more particularly, to improved constructions for floor supported free standing fluid dispenser assemblies and stands therefore that have advantageous characteristics of simplicity, low cost and protection against damage on being tipped over.

BACKGROUND OF THE INVENTION

Floor supported free standing fluid dispenser assemblies are known which provide a fluid dispenser for dispensing a hand cleaner from the top of a support stand whose lower end is supported on a floor of a building. The free standing fluid dispenser assemblies are portable and may be manually moved to different locations. Known such dispenser assemblies include those, for example, disclosed in United States Patent Application Publication US 2015/0313422 to Ophardt et al, published Nov. 5, 2015; U.S. Design Pat. U.S. D671,346 to Zlatic et al, published Nov. 27, 2002; U.S. Design Pat. U.S. D735,487 to Morino, granted Aug. 4, 2015; and U.S. Design Pat. U.S. D818,739 to Buell et al, granted May 29, 2018.

Such previously known dispenser assemblies suffer from a number of disadvantages. A first disadvantage is that the construction of such dispenser assemblies is relatively complex involving a number of different components and having substantial cost. The applicant has appreciated that known complex and relatively expensive dispenser assemblies and stands therefore have the disadvantages of not meeting an increased need for inexpensive constructions which can facilitate the deployment of the dispenser assemblies at a great many locations as, for example, in schools, daycare, hospitals, health care facilities, airports, homes and the like. The applicant has appreciated the disadvantage of such dispenser assemblies and stands therefore is that the dispenser assemblies in normal use will have a likelihood of being tipped over. Such dispenser assemblies typically have a stand with a base supported on the floor and a fluid dispenser mounted at a height above the floor convenient for discharge of a cleaning or disinfecting liquid from a discharge outlet onto a user's hand. These dispenser assemblies are provided at locations where users may walk or otherwise move up to the dispenser such that the user can place their hand near a discharge outlet of the fluid dispenser to receive the fluid. In the normal course of operation, persons or other movable objects such as trolleys, wagons, luggage and the like may inadvertently be moved into a dispenser assembly causing the dispenser assembly to be knocked over as by tipping about the base of the dispenser assembly that supports the dispenser assembly on the floor. The applicant has appreciated a disadvantage of previously known dispenser assemblies is that the dispenser assembly on being tipped frequently will become damaged in tipping in the impact with the floor rendering the dispenser assembly unsightly or inoperative as, for example, by a fluid dispenser proximate an upper end of the dispenser assembly in the tipping impacting a hard floor with relatively considerable impact forces.

SUMMARY OF THE INVENTION

To at least partially overcome these disadvantages of previously known devices, the present invention provides a floor supported free standing dispenser assembly including a fall arrest bumper member which will engage with the floor to reduce damage from any impact with the floor should the stand or dispenser assembly be tipped over.

To overcome other disadvantages of the previously known devices, the present invention provides a free standing floor support stand adapted to carry a fragile member at an upper end with the stand carrying a fall arrest bumper member which should the free standing stand be tipped over on pivoting on the floor at the lower end, the bumper surface will engage with the floor reducing the likelihood of damage to the fragile member carried on the stand.

To overcome other disadvantages of the previously known devices, the present invention provides a floor supported free standing dispenser assembly with a stand comprising a pole member with an interior cavity open at an upper end and with at least a portion of a fluid dispenser received within the interior cavity.

To overcome other disadvantages of the previously known devices, the present invention provides a free standing floor support stand comprising a pole member with an interior cavity open at an upper end adapted to carry a fluid dispenser with at least a portion of a fluid dispenser received within the interior cavity.

To overcome other disadvantages of the previously known devices, the present invention provides a method of use of a free standing floor support stand to support a fragile member at an upper end of the stand and/or to provide a storage compartment within a pole member of the stand.

In a $1^{st}$ aspect, the present invention provides a free standing dispenser assembly comprising:
  a free standing support stand supported on a horizontal floor,
  the stand having an upper end and a lower end,
  the stand having at the lower end floor engaging surfaces to engage the floor,
  wherein with the floor engaging surfaces engaging the floor, the dispenser assembly is supported in a free standing upright position on the floor with the stand extending upwardly about a vertical axis from the lower end to the upper end,
  the dispenser assembly including a fluid dispenser carried by the stand for discharging a fluid from a discharge outlet spaced upwardly from the lower end of the stand,
  the dispenser assembly including a fall arrest bumper member,
  the dispenser assembly carrying the bumper member spaced upwardly from the lower end of the stand,
  the bumper member having a radially outwardly directed bumper surface located radially outwardly from vertical axis,
  the lower end of the stand having pivot surfaces about which the dispenser assembly when in the upright position will, if sufficient lateral forces are applied to the dispenser assembly spaced upwardly from the lower end of the stand, pivot engaged with the floor, tipping the dispenser assembly from the upright position to a tipped prone position in which the dispenser assembly is supported on the floor by engagement between the floor and both the pivot surfaces and the bumper surface, the bumper surface provided at circumferential locations about the axis, axially spaced from the lower end of the stand and radially outwardly from the axis such that when the dispenser assembly is tipped in any radial direction relative the axis from the upright position toward the prone position with the pivot surfaces remaining engaged with the floor, the bumper surface will engage with the floor before other surfaces of the dispenser assembly come to engage the floor.

In a 2$^{nd}$ aspect, the present invention provides in accordance with the 1$^{st}$ aspect, a free standing dispenser assembly comprising:

a free standing support stand supported on a horizontal floor, the stand having an upper end and a lower end, the stand having at the lower end floor engaging surfaces to engage the floor, wherein with the floor engaging surfaces engaging the floor, the dispenser assembly is supported in a free standing upright position on the floor with the stand extending upwardly about a vertical axis from the lower end to the upper end, the dispenser assembly including a fluid dispenser carried by the stand for discharging a fluid from a discharge outlet spaced upwardly from the lower end of the stand, the fluid dispenser includes a discharge tube extending radially outwardly relative the axis to the discharge outlet, the discharge tube mounted to the fluid dispenser for rotation about an axis parallel axis, the dispenser assembly including a fall arrest bumper member, the dispenser assembly carrying the bumper member spaced upwardly from the lower end of the stand, the bumper member having a radially outwardly directed bumper surface located radially outwardly from vertical axis, the lower end of the stand having pivot surfaces about which the dispenser assembly when in the upright position will, if sufficient lateral forces are applied to the dispenser assembly spaced upwardly from the lower end of the stand, pivot engaged with the floor, tipping the dispenser assembly from the upright position to a tipped prone position in which the dispenser assembly is supported on the floor by engagement between the floor and both the pivot surfaces and the bumper surface, the bumper surface provided at circumferential locations about the axis, axially spaced from the lower end of the stand and radially outwardly from the axis such that when the dispenser assembly is tipped in any radial direction relative the axis from the upright position toward the prone position with the pivot surfaces remaining engaged with the floor, the bumper surface will engage with the floor before other surfaces of the dispenser assembly, with the exception of surfaces of the discharge tube, come to engage the floor.

In a 3$^{rd}$ aspect, the present invention provides in accordance with the 1$^{st}$ or 2$^{nd}$ aspect, a free standing bumper assembly wherein the bumper member is resiliently deflectable for movement radially inwardly toward the axis from an inherent position to deflected positions, and when deflected from the inherent position to deflected positions returning to the inherent position under an inherent bias.

In a 4$^{th}$ aspect, the present invention provides in accordance with the 1$^{st}$ or 2$^{nd}$ aspect, a free standing bumper assembly wherein on the dispenser assembly being tipped over pivoting from the upright position to the prone position, the bumper surface engaging the floor in an impact applying an impact force, the bumper member receives the impact forces.

In a 5$^{th}$ aspect, the present invention provides in accordance with the 3$^{rd}$ aspect, a free standing bumper assembly wherein the bumper member absorbs at least part of an impact force arising in the impact so as to not transfer the entire impact force to a remainder of the dispenser assembly.

In a 6$^{th}$ aspect, the present invention provides in accordance with the 4$^{th}$ or 5$^{th}$ aspect, a free standing bumper assembly wherein the bumper member capable of withstanding the impact forces without damage of the bumper member.

In a 7$^{th}$ aspect, the present invention provides in accordance with any one of the 4$^{th}$ to 6$^{th}$ aspects, a free standing bumper assembly wherein the bumper member absorbs and/or distributes the impact force to a remainder of the dispenser assembly in a manner that other components of the dispenser assembly are not damaged by the impact.

In an 8$^{th}$ aspect, the present invention provides in accordance with any one of the 1$^{st}$ to 7$^{th}$ aspects, a free standing dispenser assembly wherein the dispenser assembly includes a drip tray located below the discharge outlet, with a vertically extending hand space provided between the discharge outlet and the drip tray within which a person's hand may be placed to receive fluid dispensed from the discharge outlet.

In a 9$^{th}$ aspect, the present invention provides in accordance with the 8$^{th}$ aspect, a free standing dispenser assembly wherein the bumper member carries the drip tray.

In a 10$^{th}$ aspect, the present invention provides in accordance with an 8$^{th}$ or 9$^{th}$ aspect, a free standing dispenser assembly wherein the drip tray is an annular member about the axis with a circumferential radially outwardly directed outer edge comprising the bumper surface.

In an 11$^{th}$ aspect, the present invention provides in accordance with the 10$^{th}$ aspect, a free standing dispenser assembly wherein the outer edge of the annular member is circular about the axis.

In a 12$^{th}$ aspect, the present invention provides in accordance with any one of the 1$^{st}$ to 11$^{th}$ aspects, a free standing dispenser assembly wherein the stand having at the lower end a base member carrying the floor engaging surfaces and the pivot surfaces.

In a 13$^{th}$ aspect, the present invention provides in accordance with the 12$^{th}$ aspect, a free standing dispenser assembly wherein the base member is an annular member about the axis with a circumferential radially outwardly directed outer edge comprising the pivot surfaces.

In a 14$^{th}$ aspect, the present invention provides in accordance with the 13$^{th}$ aspect, a free standing dispenser assembly wherein the outer edge of the base member is circular about the axis.

In a 15$^{th}$ aspect, the present invention provides in accordance with any one of the 1$^{st}$ to 14$^{th}$ aspects, a free standing dispenser assembly wherein the fluid dispenser comprising: a reservoir for a fluid to be dispensed, and a pump to dispense the fluid from the reservoir out of the discharge outlet.

In a 16$^{th}$ aspect, the present invention provides in accordance with the 15$^{th}$ aspect, a free standing dispenser assembly wherein the fluid does not flow out of the fluid dispenser unless the pump is operated.

In a 17th aspect, the present invention provides in accordance with the 15th or 16th aspect, a free standing dispenser assembly wherein the pump is a manually operated pump.

In a 18th aspect, the present invention provides in accordance with any one of the 15th to 17th aspects, a free standing dispenser assembly wherein the fluid dispenser is configured that the fluid does not flow out of the fluid dispenser when the fluid dispenser is not in the upright position unless the pump is operated.

In a 19th aspect, the present invention provides in accordance with any one of the 1st to 18th aspects, a free standing dispenser assembly wherein the fluid dispenser is configured that the fluid dispenser does not operate to discharge fluid when the dispenser is in the prone position.

In a 20th aspect, the present invention provides in accordance with any one of the 1st to 19th aspects, a free standing dispenser assembly wherein the fluid does not flow out of the fluid dispenser when the dispenser is in the prone position.

In a 21st aspect, the present invention provides in accordance with any one of the 1st to 20th aspects, a free standing dispenser assembly wherein the stand includes a pole member disposed about the axis,
the pole member having a lower end and an upper end,
the pole member providing a hollow interior cavity about the axis open at an upper access opening at the upper end of the pole member,
the fluid dispenser coupled to the upper end of the pole member extending from within the interior cavity outwardly through the access opening.

In a 22nd aspect, the present invention provides in accordance with any one of the 15th to 20th aspects, a free standing dispenser assembly wherein the stand includes a pole member disposed about the axis,
the pole member having a lower end and an upper end,
the pole member providing a hollow interior cavity about the axis open at an upper access opening at the upper end of the pole member,
the fluid dispenser coupled to the upper end of the pole member extending from within the interior cavity outwardly through the access opening,
the reservoir having an upper end and a lower end,
the fluid dispenser coupled to the upper end of the pole member with the upper end of the reservoir above the lower end of the reservoir and the lower end of the reservoir disposed within the interior cavity.

In a 23rd aspect, the present invention provides in accordance with the 22nd aspect, a free standing dispenser assembly wherein the fluid dispenser is removably engaged to the pole member with at least the reservoir extending axially downwardly through the upper access opening of the pole member into the interior cavity.

In a 24th aspect, the present invention provides in accordance with any one of the 22nd or 23rd aspects, a free standing dispenser assembly wherein the pump coupled to the upper end of the reservoir above the reservoir presenting exterior of the interior cavity, the discharge outlet accessible for a hand of a user to receive fluid discharged from the discharge outlet.

In a 25th aspect, the present invention provides in accordance with any one of the 22nd or 23rd aspects, wherein the pump having an actuator for engagement by a user to activate the pump to dispense fluid, the pump coupled to the upper end of the reservoir above the reservoir presenting exterior of the interior cavity, (a) the actuator accessible for engagement by a user to activate the pump to discharge fluid, and (b) the discharge outlet accessible for a hand of a user to receive fluid discharged from the discharge outlet.

In a 26th aspect, the present invention provides in accordance with any one of the 15th to 20th and 22nd aspects, wherein the reservoir contains the fluid in a fluid compartment disposed coaxially about the axis when the reservoir is coupled to the dispenser assembly.

In a 27th aspect, the present invention provides a free standing dispenser assembly comprising:
a fluid dispenser and a stand adapted to be supported on a horizontal floor,
the fluid dispenser comprising: a reservoir for a fluid to be dispensed and a pump to dispense the fluid from the reservoir out of a discharge outlet,
the pump having an actuator for engagement by a user to activate the pump to dispense fluid,
the reservoir having an upper end and a lower end,
the pump coupled to the upper end of the reservoir extending upwardly therefrom,
the stand having an upper end and a lower end,
the stand extending from the lower end to the upper end about an axis,
the stand having a base member and an elongate pole member,
the pole member having a lower end and an upper end,
the pole member providing a hollow interior cavity about the axis open at an upper access opening at the upper end of the pole member,
the base member provided at the lower end of the stand coupled to the lower end of the pole member with the pole member extending away from the base member to the upper end of the pole member spaced from the base member and with the pole member disposed about the axis,
the base member carrying floor engaging surfaces to engage the floor located radially outwardly from the axis, wherein with the floor engaging surfaces engaging the floor, the stand is supported in a free standing position on the floor with the axis vertical,
the fluid dispenser coupled to the upper end of the pole member extending from within the interior cavity outwardly through the access opening:
with the upper end of the reservoir above the lower end of the reservoir,
with the lower end of the reservoir disposed within the interior cavity, and
with the pump coupled to the upper end of the reservoir above the reservoir presenting exterior of the interior cavity, (a) the actuator accessible for engagement by a user to activate the pump to discharge fluid, and (b) the discharge outlet accessible for a hand of a user to receive fluid discharged from the discharge outlet.

In a 28th aspect, the present invention provides in accordance with the 27th aspect, a dispenser assembly wherein the pole member comprising a hollow tube member defining the interior cavity therein.

In a 29th aspect, the present invention provides in accordance with the 27th or 28th aspect, a dispenser assembly wherein the tube member has a constant cross-section along its length and the interior cavity extends from the upper access opening to a lower access opening at the lower end of the pole member.

In a 30th aspect, the present invention provides in accordance with the 28th or 29th aspect, a dispenser assembly wherein the tube member is formed by an extrusion process.

In a 31st aspect, the present invention provides in accordance with any one of the 27th to 30th aspects, a dispenser assembly wherein the reservoir is axially slidable into and out of the interior cavity via the upper access opening for insertion of the lower end of the reservoir into the interior cavity, and removal of the lower end of the reservoir from the interior cavity.

In a 32$^{nd}$ aspect, the present invention provides in accordance with any one of the 27$^{th}$ to 31$^{st}$ aspects wherein:
  the pump comprises a piston pump,
  the actuator comprises a piston-forming element of the piston pump,
  the piston pump further including a piston chamber-forming body,
  the piston chamber-forming body coupled to the upper end of the pole member with the actuator coupled to the piston chamber-forming body to extend upwardly from the piston chamber-forming body for access by a user,
  the reservoir having an opening at the upper end of the reservoir for access to the fluid in the reservoir,
  the piston chamber-forming body coupled to the upper end of the reservoir placing the piston pump in communication with the fluid in the reservoir,
  the piston chamber-forming body when coupled to the upper end of the pole member supporting the reservoir within the cavity below the piston chamber-forming body.

In a 33$^{rd}$ aspect, the present invention provides in accordance with the 32$^{nd}$ aspect, a dispenser assembly wherein the piston-forming element reciprocally movable relative the piston chamber-forming body parallel the axis to discharge fluid from the reservoir out the discharge outlet.

In a 34$^{th}$ aspect, the present invention provides in accordance with the 32$^{nd}$ or 33$^{rd}$ aspect, a dispenser assembly wherein the piston chamber-forming body is coupled to the pole member for axial sliding with upwardly directed surfaces of the pole member engaging downwardly directed surfaces on the piston chamber-forming body to stop downward movement in a desired coupled position.

In a 35$^{th}$ aspect, the present invention provides in accordance with any one of the 32$^{nd}$ to 34$^{th}$ aspects, a dispenser assembly wherein a reservoir receiving compartment is defined between the piston chamber-forming body and the pole member, the reservoir receiving compartment including the interior cavity, the reservoir disposed entirely within the reservoir receiving compartment.

In a 36$^{th}$ aspect, the present invention provides in accordance with any one of the 27$^{th}$ to 35$^{th}$ aspects, a dispenser assembly wherein:
  the fluid dispenser is coupled to the upper end of the pole member with the reservoir disposed entirely within the interior cavity.

In a 37$^{th}$ aspect, the present invention provides in accordance with any one of the 27$^{th}$ to 36$^{th}$ aspects, a dispenser assembly wherein the pump includes a discharge tube extending radially outwardly relative the axis from the pump to the discharge outlet.

In a 38$^{th}$ aspect, the present invention provides in accordance with the 37$^{th}$ aspect, a dispenser assembly wherein the discharge tube mounted to the pump for rotation about the axis.

In a 39$^{th}$ aspect, the present invention provides in accordance with the 38$^{th}$ aspect, a dispenser assembly wherein the fluid dispenser when coupled to the upper end of the pole member, with the exception of the discharge tube and the discharge outlet, does not extend radially relative the axis beyond the radial extent with the pole member.

In a 40$^{th}$ aspect, the present invention provides in accordance with the 38$^{th}$ aspect, a dispenser assembly wherein the fluid dispenser when coupled to the upper end of the pole member, with the exception of the discharge tube and the discharge outlet, does not extend radially relative the axis beyond a maximum radial extent that the pole member and the piston chamber-forming body extends radially relative the axis.

In a 41$^{st}$ aspect, the present invention provides in accordance with any one of the 27$^{th}$ to 40$^{th}$ aspects, a dispenser assembly wherein the pole member comprises two or more elongate sections of the hollow tube member which are adapted to be removably coupled end to end to each other, and the height of the fluid dispenser from the floor can be adjusted by providing the pole member to be formed from one or more of the elongate sections.

In a 42$^{nd}$ aspect, the present invention provides in accordance with any one of the 27$^{th}$ to 41$^{st}$ aspects, a dispenser assembly wherein the fluid dispenser is removably coupled to stand by a similar replacement fluid dispenser.

In a 43$^{rd}$ aspect, the present invention provides in accordance with the 42$^{nd}$ aspect, a dispenser assembly wherein the interior cavity of the pole member below the coupled fluid dispenser is adapted to removably receive the replacement fluid dispenser for storage and removal.

In a 44$^{th}$ aspect, the present invention provides in accordance with the 43$^{rd}$ aspect, a dispenser assembly wherein the interior cavity of the pole member below the coupled fluid dispenser is adapted to removably receive the replacement fluid dispenser supported by the base member for storage and removal.

In a 45$^{th}$ aspect, the present invention provides in accordance with the 42$^{nd}$ aspect, a dispenser assembly wherein in the dispenser includes the replacement fluid dispenser removably provided stored within the interior of the pole member below the fluid dispenser.

In a 46$^{th}$ aspect, the present invention provides free standing stand:
  a support stand adapted to be supported on a horizontal floor,
  the stand having an upper end and a lower end,
  the stand having at the lower end floor engaging surfaces to engage the floor,
  wherein with the floor engaging surfaces engaging the floor, the stand is supported in a free standing upright position on the floor with the stand extending upwardly about a vertical axis from the lower end to the upper end,
  the stand including a fall arrest bumper member spaced upwardly from the lower end toward the upper end,
  the bumper member having a radially outwardly directed bumper surface located radially outwardly from vertical axis,
  the lower end of the stand having pivot surfaces about which the stand, when in the upright position will, if sufficient lateral forces are applied to the stand spaced upwardly from the lower end of the stand, pivot engaged with the floor, tipping the stand from the upright position to a tipped prone position in which the stand is supported on the floor by engagement between the floor and both the pivot surfaces and the bumper surface,
  the bumper surface provided at circumferential locations about the axis, axially spaced from the lower end of the stand and radially outwardly from the axis such that when the stand is tipped in any radial direction relative the axis from the upright position toward the prone position with the pivot surfaces remaining engaged with the floor, the bumper surface will engage with the floor before other surfaces of the stand will come to engage the floor.

In a 47th aspect, the present invention provides in accordance with the 46th aspect, a stand wherein the bumper member is resiliently deflectable for movement radially inwardly toward the axis from an inherent position to deflected positions, and when deflected from the inherent position to deflected positions returning to the inherent position under an inherent bias.

In a 48th aspect, the present invention provides in accordance with the 46th or 47th aspect, a stand wherein on the stand being tipped over pivoting from the upright position to the prone position, the bumper surface engaging the floor in an impact applying an impact force, the bumper member receives the impact forces.

In a 49th aspect, the present invention provides in accordance with the 48th aspect, a stand wherein the bumper member absorbs at least part of an impact force arising in the impact so as to not transfer the entire impact force to a remainder of the stand.

In a 50th aspect, the present invention provides in accordance with the 48th or 49th aspect, a stand wherein the bumper member is capable of withstanding the impact forces without damage to the bumper member.

In a 51st aspect, the present invention provides in accordance with any one of the 47th to 50th aspects, a stand wherein the bumper member absorbs and/or distributes the impact force to a remainder of the stand in a manner that other components of the stand are not damaged by the impact.

In a 52nd aspect, the present invention provides in accordance with any one of the 46th to 51st aspects, a stand wherein the stand having at the lower end a base member carrying the floor engaging surfaces and the pivot surfaces.

In a 53rd aspect, the present invention provides in accordance with the 52nd aspect, a stand wherein the base member is an annular member about the axis with a circumferential radially outwardly directed outer edge comprising the pivot surfaces.

In a 54th aspect, the present invention provides in accordance with the 53rd aspect, a stand wherein the outer edge of the base member is circular about the axis.

In a 55th aspect, the present invention provides in accordance with any one of the 46th to 54th aspects, a stand wherein the bumper member in annular about the axis with a bumper perimeter circular about the axis providing the bumper surface.

In a 56th aspect, the present invention provides in accordance with any one of the 46th to 55th aspects, a stand including a coupling member adapted to couple a fragile element to the stand spaced from the lower end of the stand, the bumper member selected such that when the fragile member is coupled to the stand with the coupling member when the stand is tipped in any radial direction relative the axis from the upright position toward the prone position with the pivot surfaces remaining engaged with the floor, the bumper surface will engage with the floor before other surfaces of the stand and the fragile member will come to engage the floor.

In a 57th aspect, the present invention provides in accordance with the 56th aspect, the fragile element is a fluid dispenser.

In a 58th aspect, the present invention provides in accordance with the 1st to 26th aspects, a free standing dispenser assembly wherein:

the fluid dispenser includes a discharge tube extending radially outwardly relative the axis to the discharge outlet, the discharge tube mounted to the fluid dispenser for rotation about an axis parallel the vertical axis, the other surfaces of the dispenser assembly do not include surfaces of the discharge tube, and wherein when the dispenser assembly is tipped in any radial direction relative the axis from the upright position toward the prone position with the pivot surfaces remaining engaged with the floor and the bumper surface engaging with the floor, if surfaces of the discharge tube engage the floor such engagement results in the rotation of the discharge tube about the axis parallel the vertical axis.

BRIEF DESCRIPTION OF THE DRAWINGS

Further aspects and advantages of the present invention will become apparent from the following description taken together with accompanying drawings in which.

DETAILED DESCRIPTION OF THE DRAWINGS

Figure 3:
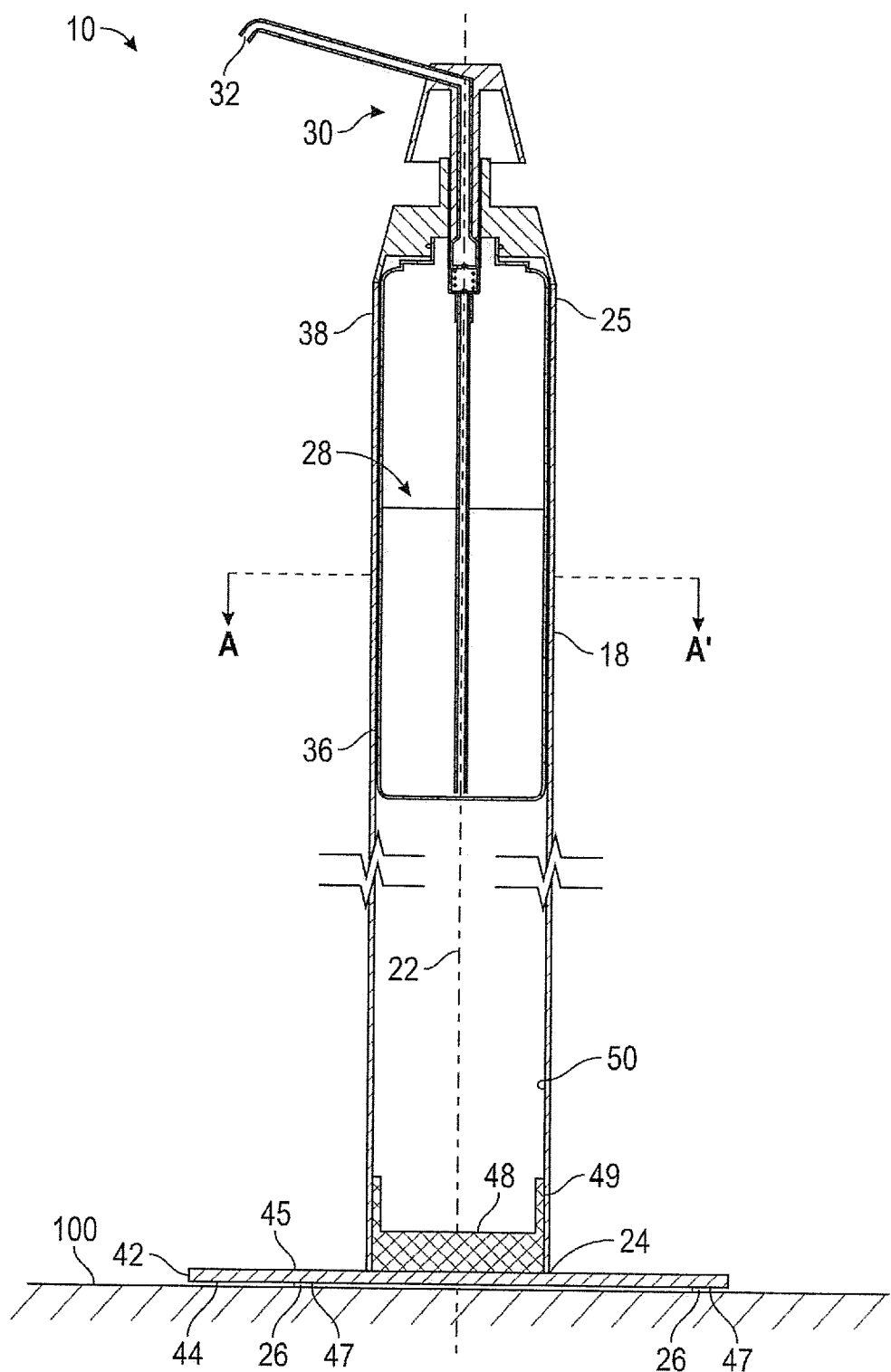
FIG. 3 is a vertical cross-sectional rear view of the dispenser assembly of FIG. 1.

Reference is made to FIGS. 1 to 5 illustrating a first embodiment of a free standing floor supported dispenser assembly 10 in accordance with the present invention. The dispenser assembly 10 comprises a free standing support stand 12 and a fluid dispenser 14. The stand 12 has a base member 16 and an elongate pole member 18. The stand 12 has an upper end 20 and a lower end 21. The stand 12 extends from the lower end 21 to the upper end 20 about an axis 22 as seen on FIG. 3. The pole member 18 has a lower end 24 and an upper end 25. The base member 16 is provided at the lower end 21 of the stand 12 coupled to the lower end 24 of the pole member 18 with the pole member 18 extending away from the base member 16 to the upper end 25 of the pole member 18 spaced from lower end 21 of the stand and with the dispenser assembly 10 disposed about the axis 22. The pole member 18 is disposed about the axis 22. As seen in FIG. 3, the lower end 21 of the stand 12 engages a horizontal floor 100 as, for example, on the ground or of any structure such as a building to support the dispenser assembly 10 in an upright position of the floor 100. The base member 16 carries downwardly direct floor engaging surfaces 26 to engage the floor such that the stand 12 is supported in an upright position in a free standing manner on the horizontal floor 100 with the axis 22 vertical.

Figure 4:
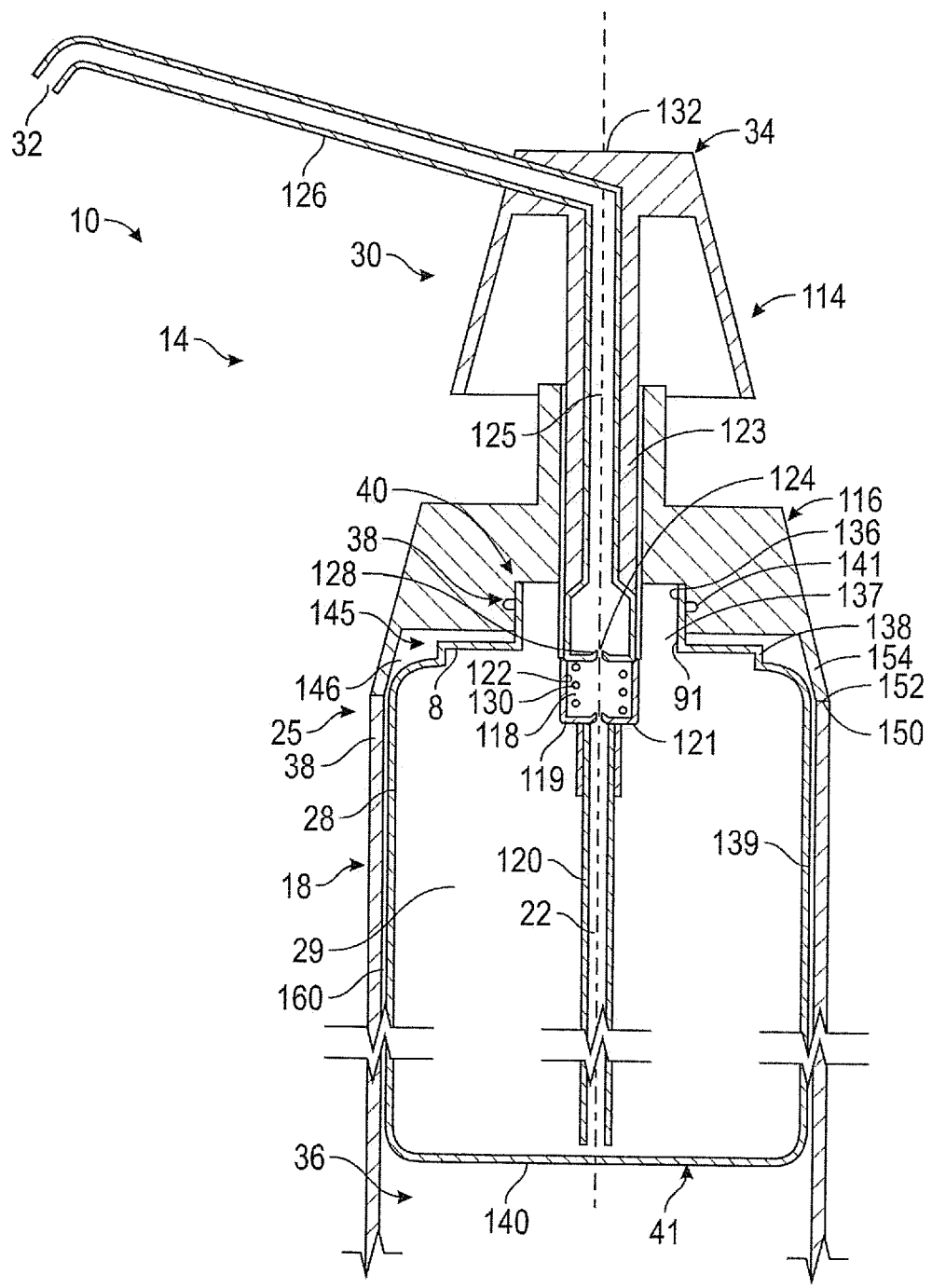
FIG. 4 is an enlarged view of the upper portion of the cross-sectional view shown in FIG. 3.

As best seen in FIG. 4, the fluid dispenser 14 includes a reservoir 28 containing a fluid 29 to be dispensed and a manually operated pump 30 operative to dispense the fluid from the reservoir 28 out of a discharge outlet 32. The discharge outlet 32 is spaced upwardly from the lower end of the stand. The pump 30 includes an activator 34 for engagement by a user to activate the pump 30 to dispense the fluid 29.

The pole member 18 provides a hollow interior cavity 36 about the axis 22 open at an upper access opening 38 at the upper end 25 of the pole member 18 and at a lower access opening at the lower end of the pole member 18.

The reservoir 28 has an upper end 40 and a lower end 41. The pump 30 is coupled to the upper end 40 of the reservoir 28 extending upwardly therefrom.

The fluid dispenser 14 is coupled to the stand 12 spaced upwardly from the lower end 21 of the stand 12. The fluid dispenser 14 is coupled to the upper end 25 of the pole member 18 extending from within the interior cavity 36 outwardly through the upper access opening 38. As seen in FIG. 3, the reservoir 28 is upright with the upper end 40 of the reservoir 28 above the lower end 41 of the reservoir 28. The lower end 41 of the reservoir 28 is disposed within the interior cavity 36 of the pole member 18. The pump 30 is coupled to the upper end 40 of the reservoir 28 above the reservoir 28 so as to present exterior of the interior cavity 36 both the actuator 34 accessible for engagement by a user to activate the pump 30 to discharge the fluid, and the discharge outlet 32 accessible for a hand of a user, not shown, to receive fluid discharged from the discharge outlet 32.

Figure 1:
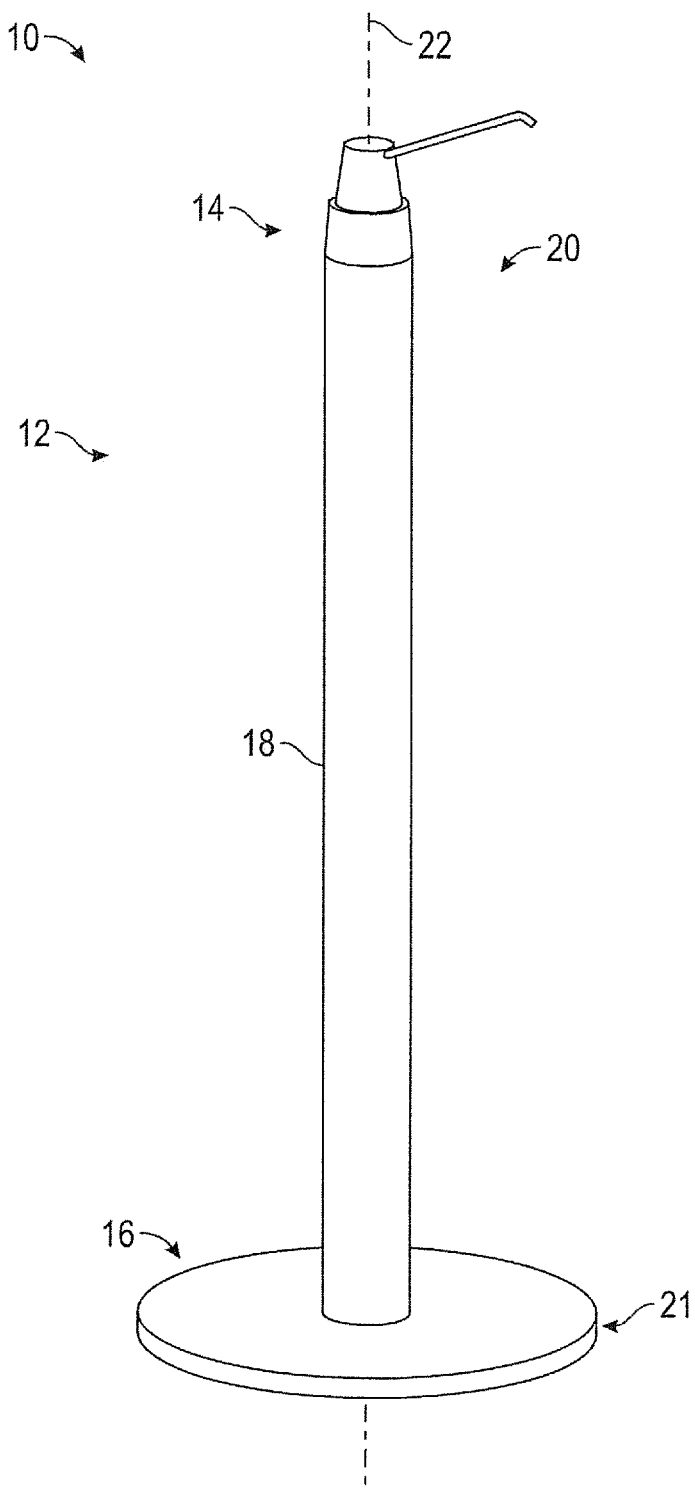
FIG. 1 is a pictorial view of a first embodiment of a free standing floor engaging dispenser assembly in accordance with the present invention.
Figure 2:
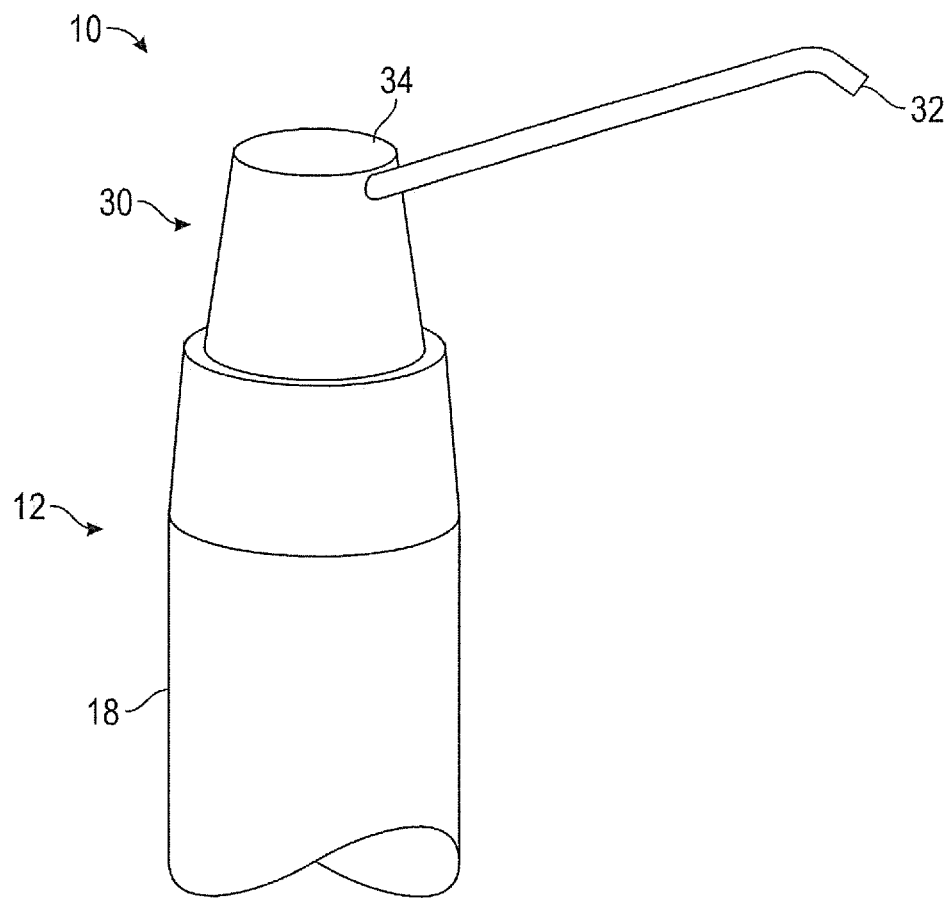
FIG. 2 is an enlarged pictorial view of the upper end of the dispenser assembly of FIG. 1.

The base member 16, as shown in FIGS. 1 and 3, is comprised of a flat planar plate member in the form of a disc that extends radially outwardly from the pole member 18 to a circumferential edge 44. As best seen in FIG. 1, the circumferential edge 44 is circular coaxially about the axis 22 with the base member 16 effectively in the form of an annular disc. The plate member of the base member 16 has an upper surface 45 and a lower surface 46. Preferably, at three circumferential locations spaced 180° apart about the axis 22, three touchdown feet 47 are provided which extend a short distance below the lower surface 46 so as to provide the floor engaging surfaces 26 on the base member 16 to engage the horizontal floor 100 at three locations and assist in supporting the base member 16 against rocking on the flat horizontal surface 100. Such touchdown feet 47 may be, for example, of resilient felt or rubber pads. The base member 16 is shown as a flat continuous disc and preferably is metal as to provide weight at the lower end 21 of the support stand 12 towards assisting in preventing the support stand 12 and the assembled dispenser assembly 10 from tipping. The particular configuration or shape of the base 16 is not limited. For example, rather than having an upper surface that is flat, the upper surface may merely comprise a disc which slopes downwardly as it moves outwardly from the axis 22. The base member 16 mayhave different shapes than circular such as square, polygonal, part polygonal, with some of the portions of its circumference being arcuate and/or linear. The base member 16 need not be a plate member and may be formed, for example, by a number of radially outwardly extending legs. Preferably, the base member 16 is an annular member about the axis 22.

FIG. 3 best shows the elongate pole member 18 as being an elongate hollow tube member defining the interior cavity 36 therein.

Figure 5:
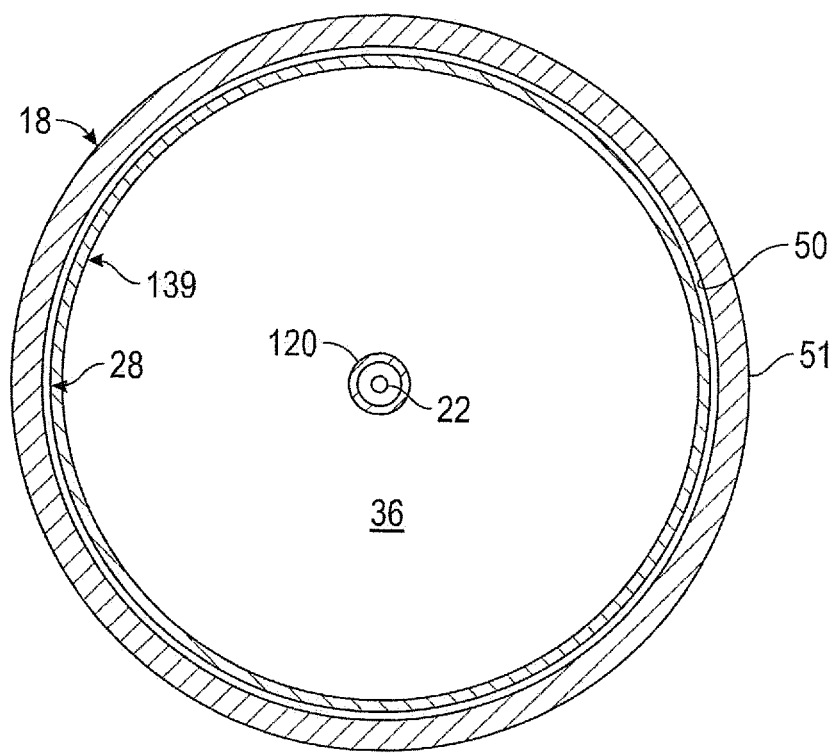
FIG. 5 is a cross-sectional view of the dispenser assembly of FIG. 3 along section line A-A.
Figure 6:
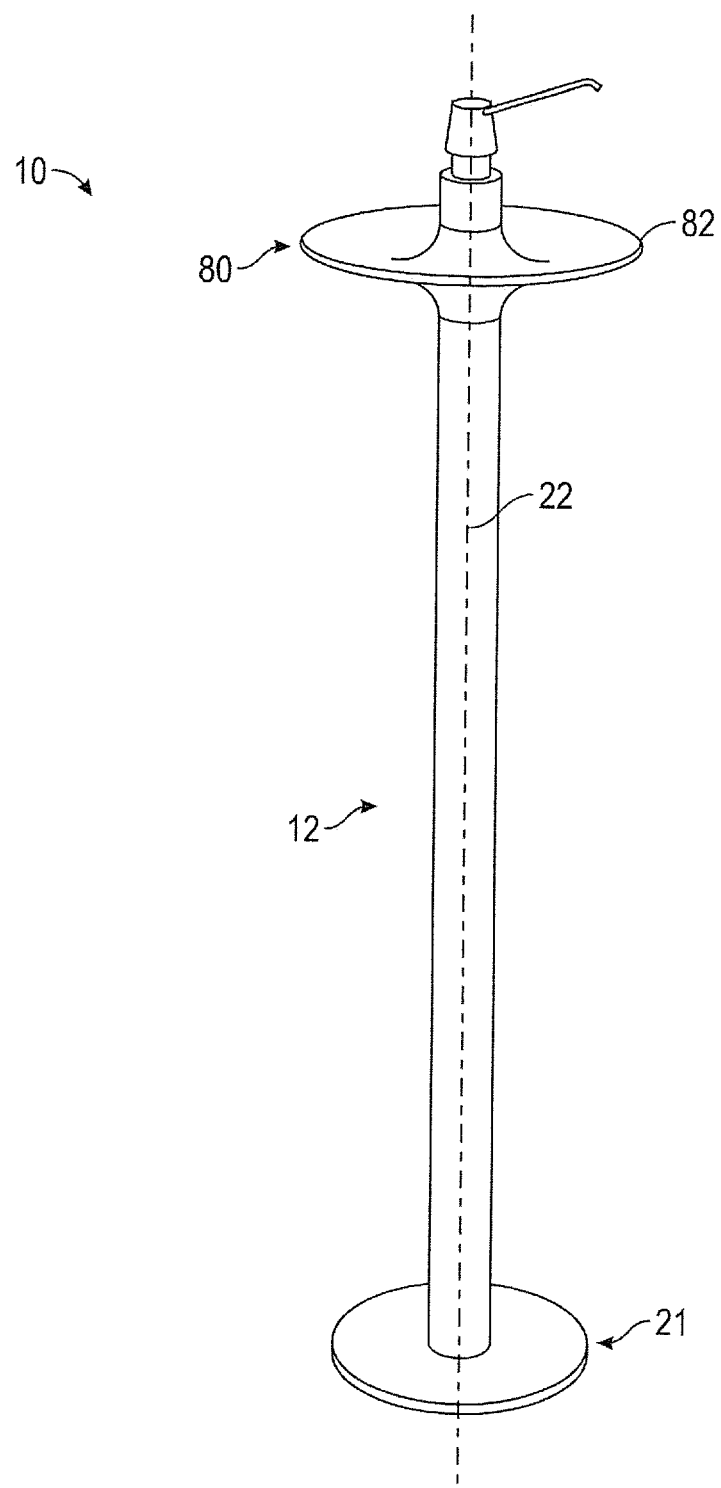
FIG. 6 is a pictorial view of a second embodiment of a dispenser assembly in accordance with the present invention.
Figure 7:
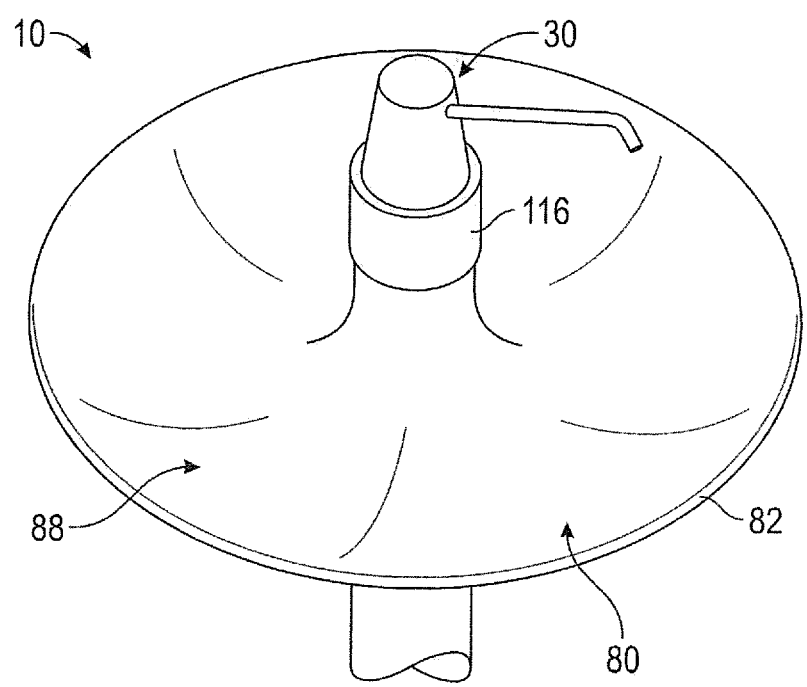
FIG. 7 is an enlarged pictorial view of the upper end of the dispenser assembly of FIG. 6.

FIG. 5 illustrates a cross-sectional view showing the pole member 18 as being circular in cross-section coaxial about the axis 22. With the tube member forming the pole member 18 being cylindrical, the tube member has a constant cross-section throughout its length. Preferably, the tube member may be formed by an extrusion process, for example, from metal or plastic. The tube member may also be formed from other materials such as fiberglass and paper materials such as paper and cardboard. The tube member is preferably lightweight and inexpensive as, for example, having a very thin wall that nevertheless can provide the strength necessary to support the fluid dispenser 14 on the base member 16.

As best seen in FIG. 3, the base member 16 includes a pole mount member 48 which fixedly secured to the base member 16. The pole mount member 48 extends upwardly about the axis 22 presenting radially outwardly directed engagement surfaces 49 to closely engage with cylindrical interior surface 50 of the pole member 18 to fixedly couple the pole member 18 to the base member 16 against relative movement.

As seen in FIG. 5, the interior surface 50 of the pole member and an exterior surface 51 of the pole member 18 are cylindrical and coaxial about the axis 22.

It is not necessary that the interior surface 50 and the exterior surface 51 of the pole member 18 are circular or of the same cross-section as alternate configurations for the pole member 18, the interior surface 50 and the exterior surface 51 of the pole member 18 may be, for example, polygonal. The exterior surface 51 mayhave a different cross-sectional shape than the interior surface 50.

In the preferred embodiment as illustrated in FIG. 1, the pole member 18 is a cylinder with a constant cross-sectional shape along the axis 22. This is not necessary. The pole member 18 mayhave radial dimensions that change between the lower end 20 and the upper end 21 as, for example, being frustoconical or partially frustoconical over a portion thereof.

The base member 16 is coupled to the pole member 18 to support the pole member 18 extending upwardly from the base member 16. The pole member 18 may be fixed to the base member 16 against removal or may be removable as can be useful in shipping, and storage disassembled.

Reference is made to FIG. 4 best showing the pump 30 and the reservoir 28 of the fluid dispenser 14. The pump 30 is a piston pump including a piston-forming element 114 coaxially reciprocally slidable within a piston chamber-forming member 116. The pump 30 shown has a substantially similar operation to that disclosed in EPO Patent Publication 3650128 to Ophardt, published May 13, 2020. The piston chamber-forming body 116 defines a liquid chamber 118 with an inlet opening 119 in communication with the fluid 29 in the reservoir 28 via a dip tube 120 open at a lower end. A one-way fluid inlet valve 121 permits flow from the reservoir 28 into the chamber 118 but prevents flow outwardly from the chamber 118 to the reservoir 28. The chamber 118 has a cylindrical wall 122 coaxially about the axis 22. The piston-forming member 114 includes a cylindrical piston 123 coaxially slidable within the chamber 118 to provide an annular seal with the chamber wall 122. The piston 123 carries at its lower end a fluid outlet 124 that opens into a discharge passageway 125 coaxially through the piston 123 and through a hollow interior of a discharge tube 126 that extends radially of the axis 22 to the discharge outlet 32. A one-way outlet valve 128 is across the fluid outlet permits fluid flow outwardly from the chamber 118 to the discharge passageway 125 but prevents fluid flow inwardly from the discharge passageway 125 into the chamber 118. A helical coil spring 130 is provided within the chamber 118 to bias the piston-forming element 114 to the extended position shown in FIG. 4. The piston-forming element 114 provides an upwardly directed engagement surface 132 for engagement by a user to move the piston-forming element 114 axially from the extended position shown in FIG. 4 to a retracted position and, in so doing, discharges the fluid 29 out the discharge outlet 31. Under the action of the spring 130, the piston-forming element 114 is moved upwardly from the retracted position to the extended position and draws the fluid from the reservoir 28 into the chamber 118. The uppermost portion of the piston-forming element 114 and the engagement surface 132 acts as the actuator 34 for engagement by a user to activate the pump 30 to dispense the fluid 29.

The particular configuration of the pump 30 is not limited. Preferably, the pump may comprise a manually operated piston pump, however, this is not necessary. Insofar as the pump 30 is a piston pump, it may have different configurations. Preferred selections of configurations for pumps should be made having regard to various factors such as: the extent to which the fluid may leak from the fluid dispenser 14 if the dispenser assembly 10 is in the prone position; the nature of the reservoir 28 as to whether it is rigid, flexible or collapsible; the extent that it is necessary to provide air to enter the reservoir 28 to replace the liquid that has been displaced to avoid a vacuum being developed within the reservoir which prevents the dispensing of the fluid; and the extent to which the fluid dispenser 14 may be desired to dispense, for example, merely liquid or liquid and air as, for example, as a foam.

Referring to FIG. 4, the reservoir 28 is shown as a container or bottle having an outlet 136 but otherwise no other openings into the interior of the reservoir 28. In the context of the fluid dispenser 14 illustrated in FIG. 4, the reservoir 28 can be selected to be collapsible such that as the fluid is discharged, the walls of the reservoir 28 will collapse upon themselves. With such a collapsible reservoir, no air needs to enter the reservoir to relieve vacuum in the reservoir. As such, should the dispenser assembly 10 or merely the fluid dispenser 14 be tipped to the prone position such that the reservoir is not vertical, the fluid will not leak out of the reservoir since leaking from the reservoir 28 is prevented by the reason of the piston chamber-forming body 116 is sealably engaged on an outlet 136 of the reservoir 28 against fluid flow therebetween and the piston 123 is sealably engaged within the chamber to prevent flow from the chamber 118 outwardly.

The piston chamber-forming body 116 sealably engages about the outlet 140 of the reservoir 28. In this regard, the reservoir 28 preferably has a coaxially extending neck 137 merging with a top wall 138 and, hence, with a side wall 139 and a bottom wall 140 of the reservoir. The neck 137 includes a radially outwardly extending annular flange 141. The piston chamber-forming body 116 includes a collar 38 adapted to be engaged in a snap-fit on the neck 137 about the flange 141 forming a sealed relationship.

The pole member 18 has at its upper end 25 an axially upwardly directed end surface 150. The piston chamber-forming body 116 carries an annular downwardly directed support surface 152 to engage the end surface 150 of the pole member 180 and thereby support the pump 30 on the upper end 25 of the pole member 18. The support surface 152 of the piston chamber-forming body 116 is shown as being carried at the lower end of an annular flange 154 carried about the collar 38 on the piston chamber-forming body 116. With the piston chamber-forming body 116 fixedly secured to the reservoir, the piston chamber-forming body 116 supports the reservoir 28 below the piston chamber-forming body 116 and within the interior cavity 36 of the pole member 18.

As seen in FIG. 5, in the preferred embodiment, the reservoir 28 has a side wall 144 which is cylindrical that is of a similar cross-sectional shape and size to that of the interior cavity 36 towards maximizing the volume of the fluid that can be contained within the reservoir 28. This is not necessary and the cross-sectional shape and size of the reservoir 28 may be different than the cross-sectional shape and size of the interior cavity 36.

Referring to FIG. 4, the reservoir 28 is axially slidable within the pole member 18 via the upper access opening 38 for insertion of the lower end 41 of the reservoir 28 into the interior cavity 36 and for removal therefrom. The fluid dispenser 14 is coupled to the upper end 25 of the pole member 18 with the reservoir 28 disposed partially within the interior cavity 36. As seen in FIG. 4, a large proportion of the reservoir 28 is disposed within the interior cavity 36 of the pole member 18.

The piston chamber-forming body 116 defines an upper cavity 145 above the upper end 25 of the pole member 18. The upper cavity 145 of the piston chamber-forming body 116 together with the interior cavity 36 of the pole member 18 define a reservoir compartment 146 within which the entirety of the reservoir 28 is contained. The piston chamber-forming body 116 can be modified in a manner such that the entirety of the reservoir 28 is within the interior cavity 36 as by providing the support surface 152 on the piston chamber-forming body 116 to be at a height above the outlet 140 of the reservoir 28 when coupled to the piston chamber-forming body 116.

In the preferred embodiment as shown, for example, in FIG. 4, a large portion of the reservoir 28 is within the interior cavity 36, preferably, at least one half, three quarters, seven-eighths or nine-tenths of the vertical height of the reservoir 28. In another preferred configuration, not shown, the fluid dispenser 14 is coupled to the upper end 25 of the pole member 18 with the reservoir 28 disposed entirely within the interior cavity 36.

As best seen in FIG. 4, a radial extent of the pole member 18 can be described as the exterior surface 51 of the pole member 18 at its upper end 25. In the preferred arrangement shown in FIG. 4, the fluid dispenser 14 when coupled to the upper end 25 of the pole member 18 does not extend radially relative the axis 22 beyond the radial extent of the pole member 18 with the exception of the discharge tube 126.

In the embodiment as illustrated in FIG. 4, discharge tube 126 is mounted to the piston chamber-forming body 116 for rotation relative to the piston chamber-forming body 116 about the axis 22. Particularly, the piston-forming element 114 is not only coaxially reciprocally slidable along the axis 22 relative to the piston chamber-forming body 116, but is also journaled for rotation relative to the piston chamber-forming body 116 about the axis 22. The ability of the discharge tube 126 as carried by the piston-forming element 14 to be rotated about the axis 22 to different axial positions provides the advantage that the discharge tube 126 can be rotated to different positions as to permit a user to discharge fluid from the discharge outlet 32 at different rotational positions about the axis 22 without the need to rotate other components, for example, the entire dispenser assembly 16, or merely the fluid dispenser 14, the pole member 18 or the base member 16.

Preferably, the fluid dispenser 14 is coupled to the upper end 25 of the pole member 18 in a manner that resists removal. This may be accomplished by adopting a number of different arrangements.

In one simple arrangement, the reservoir 28 may be received within the interior cavity 36 in a friction fit, for example, by outwardly directed surfaces 160 of the side wall 139 of the reservoir 28 engaging the interior surface 50 of the pole member 18 in a friction fit relation which resists removal of the reservoir 28 and thereby the fluid dispenser 14 from the pole member 18 unless sufficient axial directed forces are applied. Providing the reservoir 28 to have side walls which are somewhat resilient and sized to be marginally greater than a diameter of the interior surface 50 is one convenient arrangement.

As one example of the dispenser assembly 10 in accordance with the present invention, the cylindrical pole member 18 is provided having a nominal outside diameter of 3 inches or 7.62 centimeters and a wall thickness of 0.06 centimeters, which can accommodate a reservoir 28 with a cylindrical diameter of 7.5 centimeters and a cylindrical side wall of about 23 centimeters in axial length to provide within the reservoir 28 a volume of 0.5 liters of fluid. FIG. 3 illustrates the pole member 18 and the reservoir 28 having such relative proportions.

Reference is made to FIGS. 6 to 10 showing a second embodiment of a dispenser assembly 10 in accordance with the present invention. In FIGS. 6 to 10, the dispenser assembly 10 is identical to that as shown and described within the first embodiment shown in FIGS. 1 to 4, however, having an additional separate element referred to and serving as a fall arrest bumper member 80. The bumper member 80 is spaced upwardly from the lower end 21 of the stand 12. The fall arrest bumper member has a radially outwardly directed bumper surface 82 located radially outwardly from the vertical axis 22.

Figure 9:
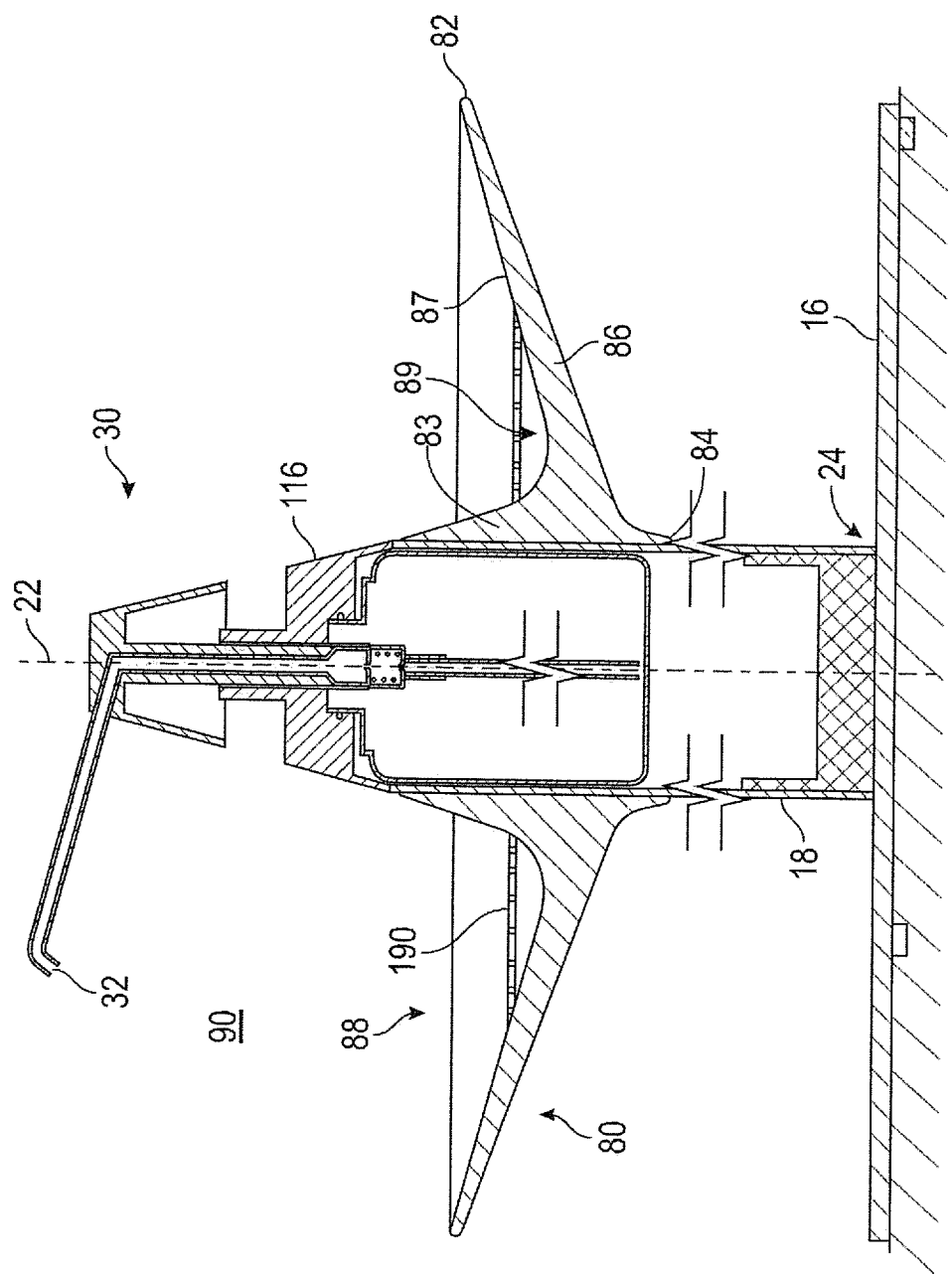
FIG. 9 is an enlarged rear cross-sectional view of the dispenser assembly as shown in FIG. 8 truncated in vertical dimension.

As best seen in FIG. 9, the bumper member 80 is an annular member disposed annularly about the axis 22. The bumper member 80 includes a tubular sleeve portion 83 coaxial about the axis 22 and providing a central opening 84 whereby the bumper member 80 is coaxially engaged in a friction fit about the pole member 18, preferably underneath the piston chamber-forming member 116 as shown. The tubular sleeve portion 83 supports an annular disc 86 that extends radially outwardly relative the axis 22 from the sleeve portion 83 and ends at the radially outwardly directed bumper surface 82.

Figure 8:
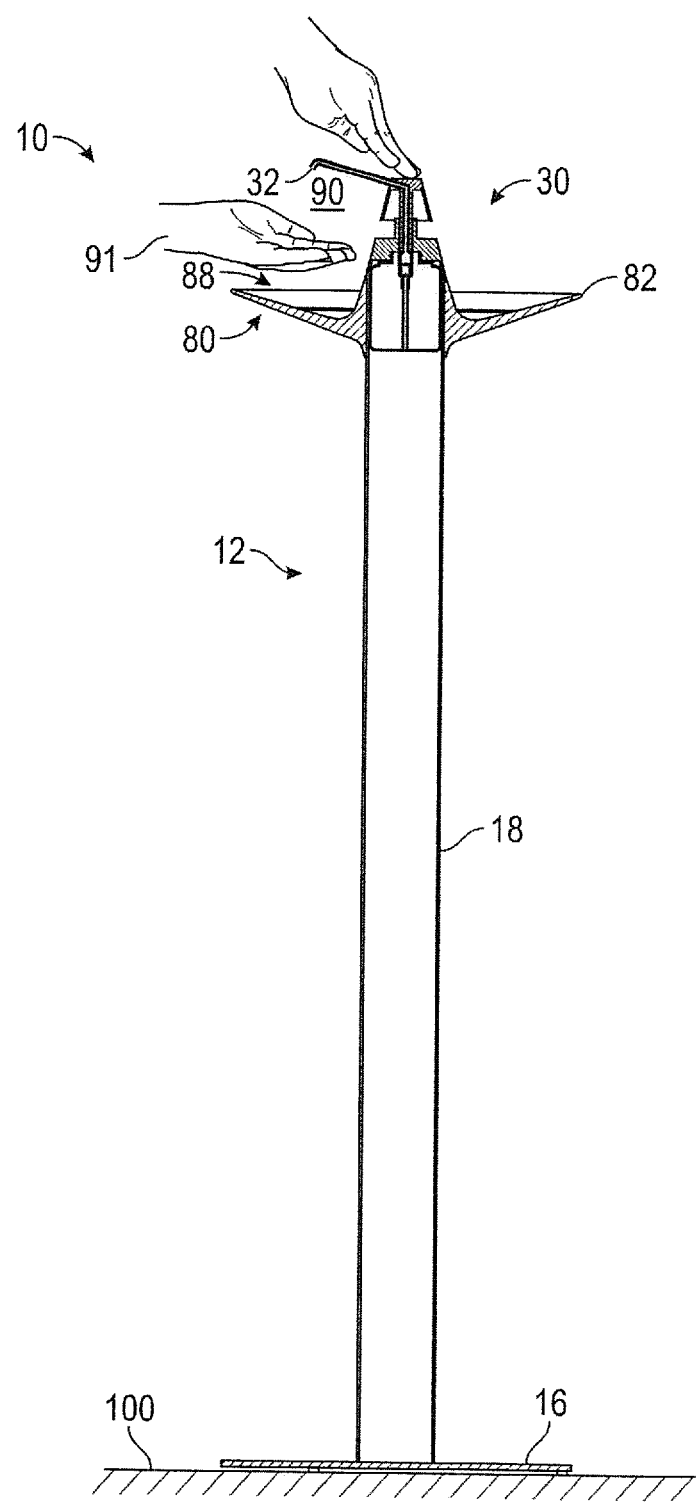
FIG. 8 is a vertical rear view of the dispenser assembly of FIG. 6 supported on a floor of a building with a drip tray shown in cross-section and with a user's hands schematically illustrating use.

As seen in FIG. 9, upwardly directed surfaces of the bumper member 80 annularly about the pole member 18 provide a fluid impermeable upwardly directed surface 87 of an annular sump 89 forming a drip tray 88 to catch fluid. As seen in FIG. 8, the drip tray 88 is located below the discharge outlet 32, with a vertically extending hand space 90 provided between the discharge outlet 32 and the drip tray 88 within which a person's hand 91 may be placed to receive the fluid dispensed from the discharge outlet 32. The fluid that may be caught by the drip tray 88 includes fluid discharged from the discharge outlet 32 of the pump 30 and fluid discharged from the discharge outlet 32 that may engage the user's hand 91 disposed above the drip tray 88 and drip down from the user's hand 91 located above the drip tray 88. Optionally, as seen on FIG. 9, a perforated annular plate 190 may sit in the drip tray 88 above the sump 89 to hide the sump 89 from sight.

As can be seen in FIG. 9, the drip tray 88 and the bumper member 80 preferably extend radially outwardly from the axis 22 a greater extent than the discharge outlet 32 is located radially outwardly from the axis 22. As seen in FIG. 9, the annular disc 86 extends radially outwardly to the radially outwardly directed bumper surface 82. In the preferred embodiment, the annular disc 86 extends axially upwardly as it extends radially outwardly.

FIG. 9 illustrates the lower end 24 of the pole member 18 being coupled to the base member 16. The dispenser assembly 10 for normal use is supported in the upright position on the horizontal floor 100 as shown, for example, in FIG. 8.

Figure 10:
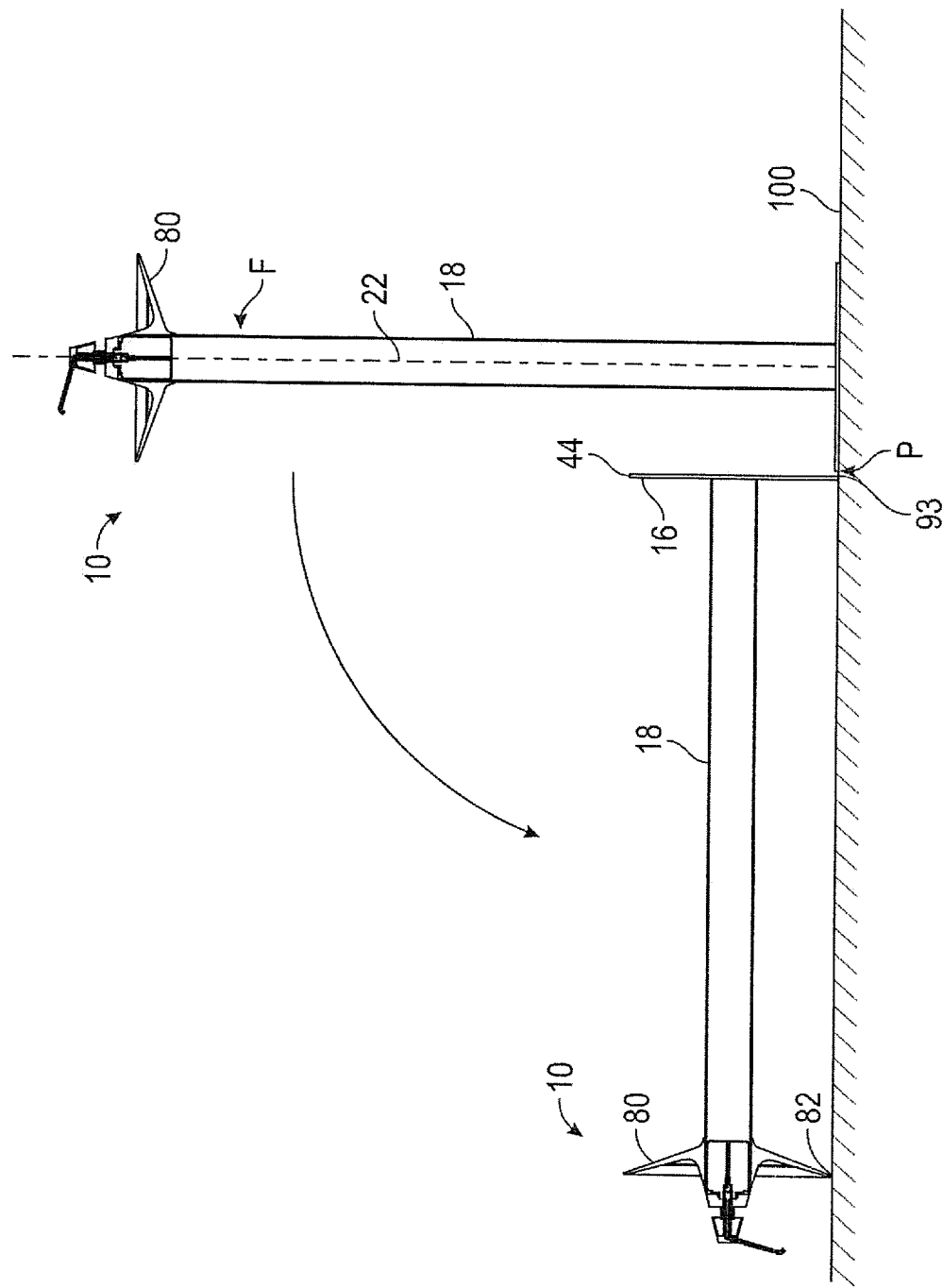
FIG. 10 illustrates two rear views of the dispenser assembly as shown in FIG. 8 firstly in an upright position supported vertically on the floor and, secondly, in a prone position as if the dispenser assembly had been tipped.

Reference is made to FIG. 10 illustrating the dispenser assembly 10 in two positions. On the right hand side of FIG. 10, the dispenser assembly 10 is shown in the upright position with the axis 22 vertical and the dispenser assembly ready for use. On the left hand side, the dispenser assembly 10 is shown in a prone position. With the dispenser assembly 10 in the upright position, if a horizontal force F is applied to the dispenser assembly 10, the upright dispenser assembly 10 will tip from the vertical position to the prone position. In tipping, the dispenser assembly 10 will pivot on the floor 100 about a pivot point P representing the engagement of the floor 100 and pivot surfaces 93 on the lower end of the stand 12. The pivot surfaces 93 are a portion of the circumferential outer edge 44 of the base member 16 with the dispenser assembly 10 to pivot about the pivot point P from the upright position shown to the prone position in which the dispenser assembly 10 extends laterally of the floor 100 with engagement between the dispenser assembly 10 and the floor 100 occurring at the pivot surfaces 93 on the base member 16 and the bumper surface 82 on the bumper member 80. In the dispenser assembly 10 falling from the upright position to the prone position, the upper end of the dispenser assembly 10 will typically accelerate and cause the bumper surface 82 of the bumper member 80 to impact with the floor 100 with impact forces which can be substantial. The bumper surface 82 is provided on the bumper member at circumferential locations about the axis 22 and spaced axially from the lower end of the stand of the dispenser assembly 10 and radially outwardly from the axis 22 such that if the dispenser assembly 10 is tipped in any radial direction relative the axis 22 from the upright position toward the prone position with the pivot surfaces 93 remaining engaged with the floor 100, the bumper surface 82 will engage with the floor 100 before other surfaces of the dispenser assembly 10 come to engage the floor 100. Preferably, the base member 16 carries both the floor engaging surfaces 26 and the pivot surfaces 93. Preferably, the base member 16 is an annular member about the axis 22 with the circumferential radially outwardly directed outer edge 44 comprising the pivot surfaces 93. Preferably, the outer edge 44 of the base member 16 is circular about the axis 22.

On the dispenser assembly 10 being tipped over pivoting from the upright position to the prone position, the bumper surface 82 engages the floor in an impact applying impact forces and the bumper member receives the impact forces. Preferably, towards lessening the transfer of the impact forces from the bumper surface 82 through the bumper member 80 to the remainder of the dispenser assembly 10, at least some portions of the bumper member 80 are provided to be resilient. In this regard, the bumper member 80 and the annular disc 86 of the bumper member 80 is preferably resilient and deflectable for movement radially inwardly towards the axis 22 from an inherent position to deflected positions and, when deflected from the inherent position to the deflected position, returns to the inherent position under an inherent bias of the bumper member 80. The bumper member 80 maypreferably be formed from a plastic material or from elastomeric material which has inherent resiliency selected to reasonably absorb impact forces caused on tipping by impact of the bumper member 80 with the floor. By a suitable selection of the resiliency of the bumper member 80, selected levels of impact forces can be absorbed by the bumper member 80 so as to reduce possible damage from the impact to other components of the dispenser assembly 10 notably to the fluid dispenser 14 and its components. Preferably, the bumper member 80 will be the only component of the dispenser assembly 10 at the upper end of the dispenser assembly 10 which will come into contact with the floor 100 when tipped. Preferably, the bumper member 80 will absorb at least part of the impact force arising in the impact so as to not transfer the entire impact force to a remainder of the dispenser assembly 10. Preferably, the bumper member 80 is capable of withstanding the impact forces with damage to the bumper member 80. Preferably, the bumper member absorbs and/or distributes the impact force to a remainder of the dispenser assembly in a manner that other components of the dispenser assembly are not damaged by the impact. The bumper member 80 may be broken into replaceable components on the impact as another mechanism for absorbing portions of the impact forces.

As can be seen in FIGS. 6 to 10, the bumper member 80 carries the drip tray 88. Preferably, the drip tray 88 is an annular member about the axis with a circumferential radially outwardly directed outer edge comprising the bumper surface 82. Preferably, the outer edge of the annular member is circular about the axis 22.

The bumper assembly 80 in the second embodiment of FIGS. 6 to 10 serves a first purpose of receiving and preferably distributing or absorbing impacts with the floor on tipping and, secondly, of providing a drip tray 88. In accordance with the present invention, a dispenser assembly 10 mayinclude either one or both of a separate bumper member 80 and a separate drip tray 88 without the need for the bumper member 80 and the drip tray 88 to be the same element.

Figure 11:
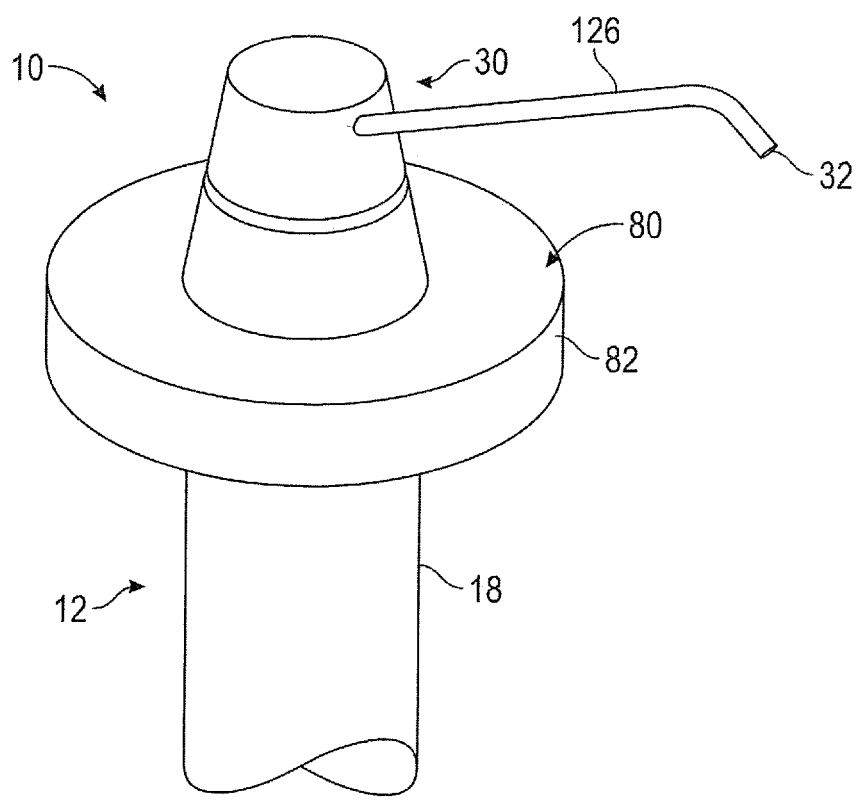
FIG. 11 is an enlarged pictorial view of an upper end of a dispenser assembly in accordance with a third embodiment of the invention.
Figure 12:
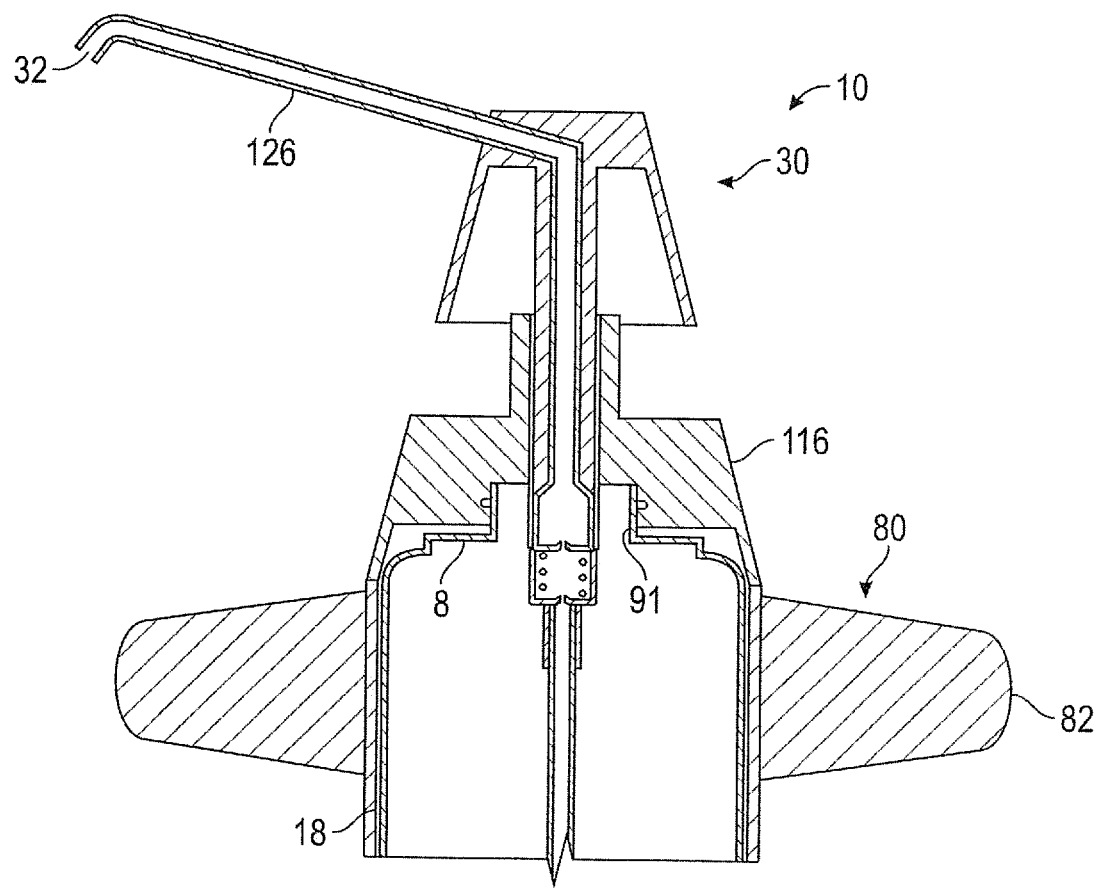
FIG. 12 is a cross-sectional rear view of the dispenser assembly in FIG. 11.

Reference is made to FIGS. 11 and 12 illustrating a third embodiment of a dispenser assembly 10 in accordance with the present invention. In FIGS. 11 and 12, the dispenser assembly 10 is identical to the dispenser assembly 10 illustrated in FIGS. 1 to 4, however, a fall arrest bumper member 80 is provided coupled to the dispenser assembly 10 spaced from the lower end of the dispenser assembly. In FIGS. 11 and 12, the bumper member 18 is shown engaged about the pole member 18 proximate the upper end of the pole member 18. In FIGS. 11 and 12, the bumper member 80 comprises a resilient member presenting the bumper surface 82 radially outwardly from the axis 22. The bumper member 80 preferably may be formed from an elastomeric material such as a soft or foam rubber. When a dispenser assembly 10 of FIG. 11 or 12 is tipped to pivot about its lower end and to have the upper end of the dispenser assembly impact the floor, with the exception of the discharge tube 126, the bumper surface 82 of the bumper member 80 will engage the floor 100 without other surfaces of the upper end of the dispenser assembly 10 engaging the floor. The bumper member 80 is preferably resilient and will absorb at least portions of the impact forces.

Regarding the discharge tube 126, the discharge tube 126 is adapted to rotate about the axis 22 with the piston-forming element 114 relative to the remainder of the dispenser assembly 10. If the discharge tube 126 is at an angular position relative the axis 22 that on tipping of the dispenser assembly 10, the outer end of the discharge tube 126 engages the floor 100, engagement between the floor and the discharge tube 126 will rotate the discharge tube 126 away from the floor substantially reducing the impact forces acting on the discharge tube 126. In the embodiment illustrated in FIGS. 11 and 12, the bumper member 80 does not extend radially outwardly past the discharge tube 186. However, a similar annular bumper member 80 to that shown in FIG. 11 or 12 could be provided which extends radially outwardly sufficiently, preferably past the discharge tube 126, such that merely the bumper member 80 and not the discharge tube 126 would engage with the floor on tipping.

Figure 13:
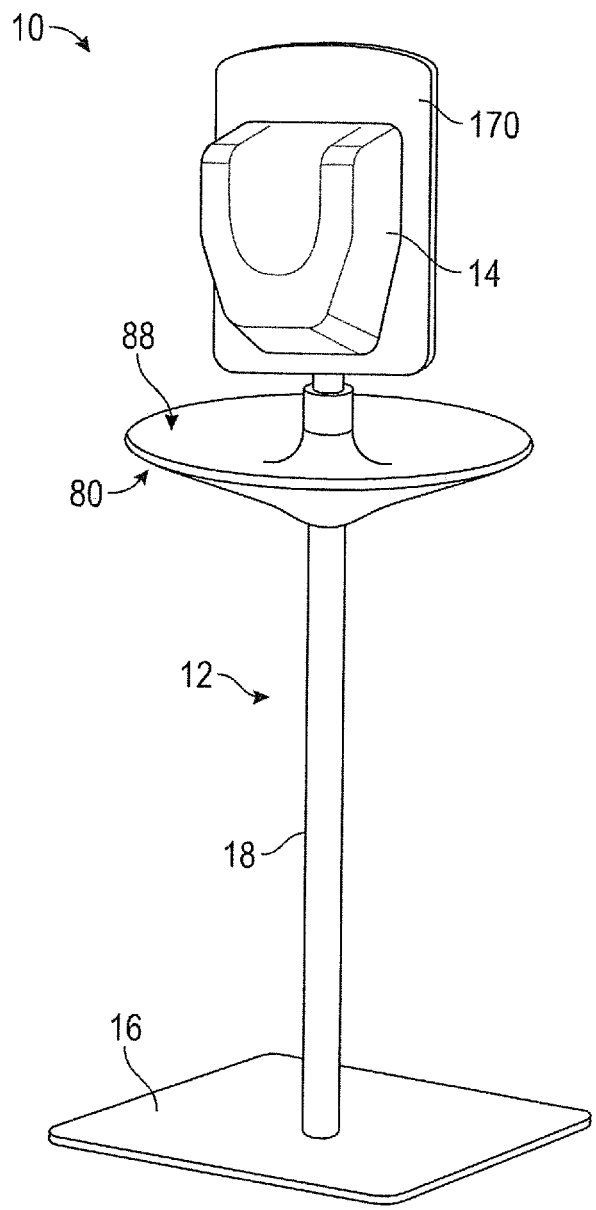
FIG. 13 is a pictorial view of a free standing floor mounted dispenser assembly in accordance with a fourth embodiment of the present invention.

Reference is made to FIG. 13 which shows a fourth embodiment of a dispensing assembly 10 in accordance with the present invention. The dispensing assembly 10 of FIG. 13 has a free standing support stand 12 including a rectangular shaped base member 16 from which an elongate pole member 18 extends upwardly. A planar back plate 170 is secured to the pole member 18. A touchless hand cleaning fluid dispenser 14 is secured to the back plate 170. A fall arrest bumper member 80 incorporating drip tray 88 similar to that shown in FIGS. 6 to 10 is secured to the pole member 18 below the fluid dispenser 14.

Figure 14:
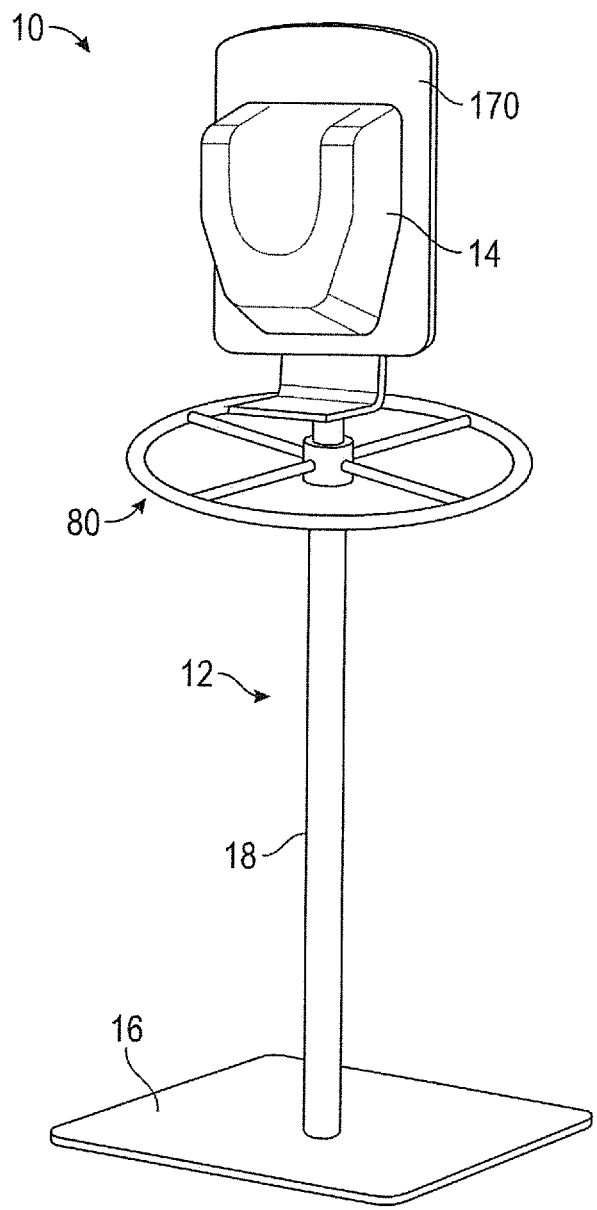
FIG. 14 is a pictorial view of a free standing floor mounted dispenser assembly in accordance with a fifth embodiment of the present invention.

Reference is made to FIG. 14 which illustrates a fifth embodiment of a dispensing apparatus 10 in accordance with the present invention. In FIG. 14, the support stand 12 includes a rectangular base member 16 from which an elongate pole member 18 extends upwardly. A planar back plate 170 is secured to the pole member 18. A fluid dispenser 14 is secured to the back plate and the fluid dispenser 14 includes a drip tray 88 attached thereto. A fall arrest bumper member 80 is carried on the pole member 18 below the drip tray 88. In FIG. 14, the bumper member 80 has a series of radially extending spoke members 164 that support a circumferentially extending annular tube 165. The annular tube 165 and spoke members 164 may be provided to be resilient towards absorbing the forces of an impact.

Figure 15:
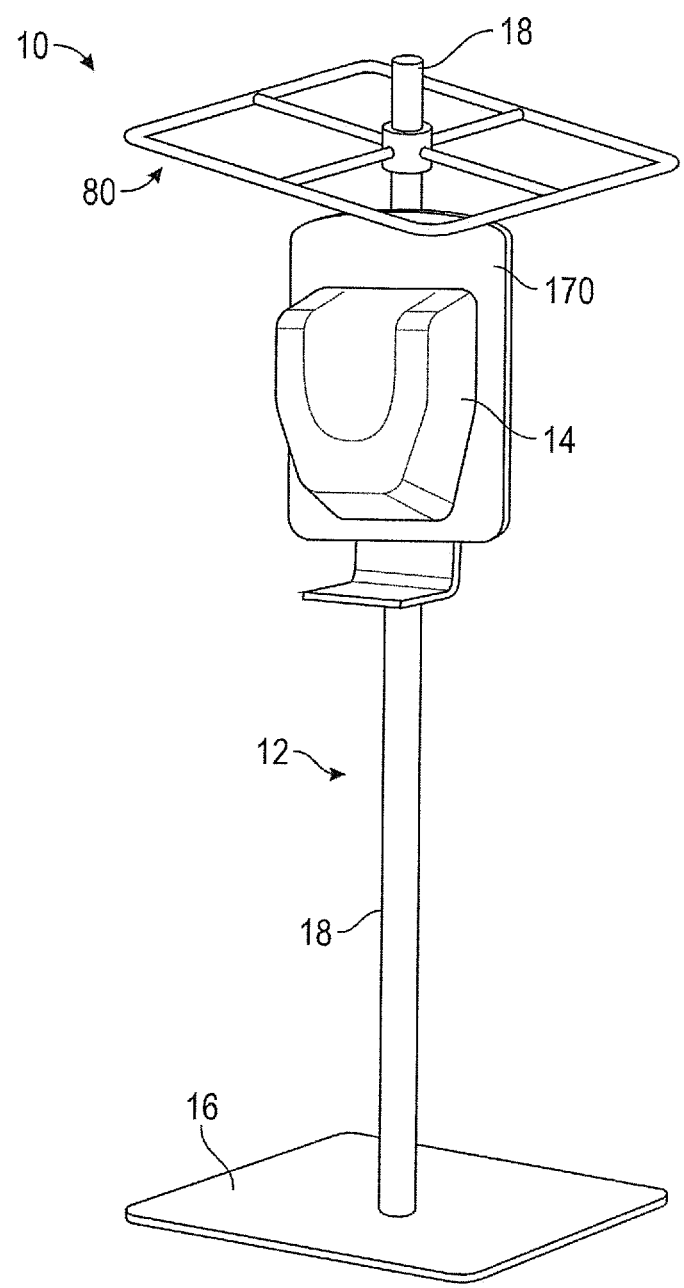
FIG. 15 illustrates a free standing floor mounted dispenser assembly in accordance with a sixth embodiment of the present invention.

Reference is made to FIG. 15 showing a dispenser assembly 10 including a stand 12 with a rectangular base member 16 supporting an elongate pole member 18. A planar back plate 170 is secured to the pole member 18. A fluid dispenser 14 including a drip tray 88 is secured to the back plate 170. A fall arrest bumper member 80 is secured to the pole member 18 above the fluid dispenser 14. FIG. 15 illustrates a bumper member 80 similar to that shown in FIG. 14 with radially extending spokes 164 and an outer circumferential member 167 that is polygonal. The bumper member 80 need not be circular but could be part polygonal or part circular or a combination.

Figure 16:
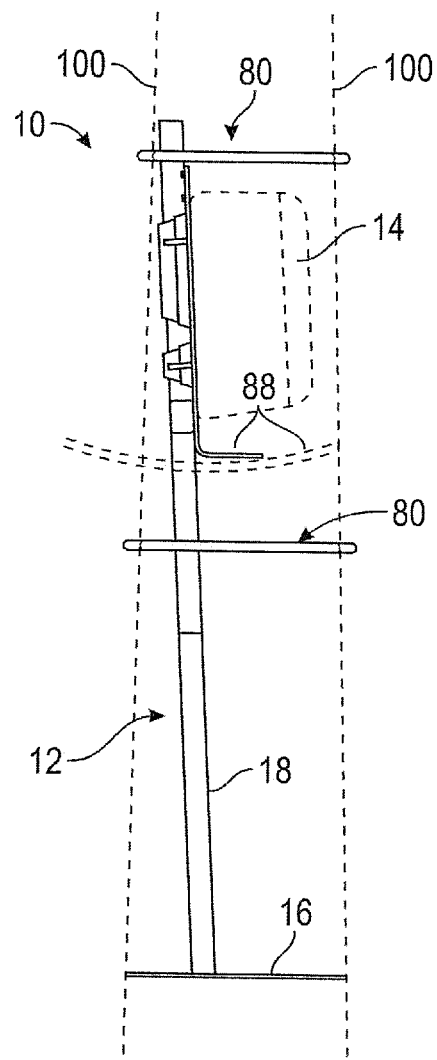
FIGS. 16 and 17 are, respectively, a side view and a front view showing cumulatively the features of each of the dispenser assemblies of FIGS. 13, 14 and 15 with the fluid dispenser shown in dashed lines.
Figure 17:
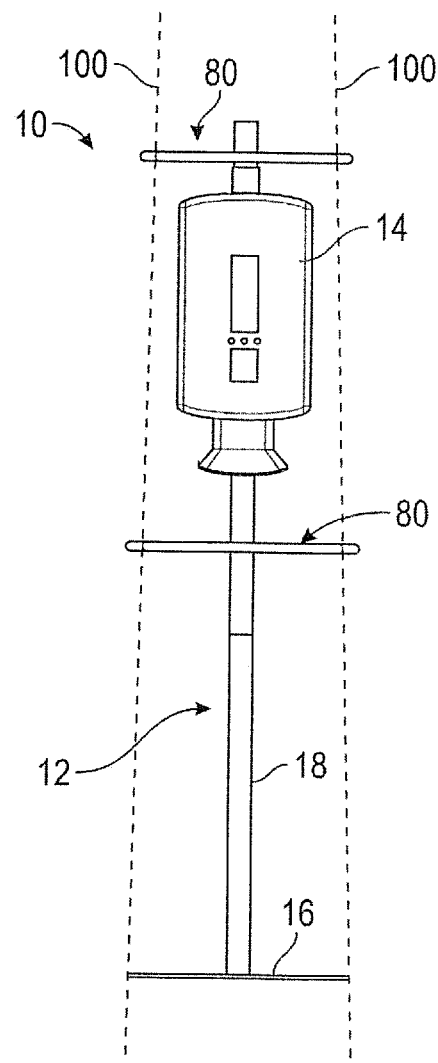

FIGS. 16 and 17 illustrate side views showing components representing each of the elements in FIGS. 13 to 15. In each of the embodiments of FIGS. 13 to 15, the base member 16 is the same, the pole member 18 is the same other than as to its height, the back plate 170 member is the same and the fluid dispenser 14 is the same. On FIGS. 16 and 17, the fluid dispenser 14 is shown as transparent in dashed lines. The combined bumper member 80 and drip tray 88 of FIG. 16 is shown in dotted lines. The drip tray 88 of FIGS. 14 and 15 carried by the fluid dispenser 14 is shown in broken lines. The bumper member 80 of FIG. 13 is shown in solid lines below the fluid dispenser 14 of FIGS. 16 and 17. The bumper member 80 of FIG. 15 is shown in solid lines above the fluid dispenser 14 on FIGS. 16 and 17.

On FIGS. 16 and 17, vertical dashed lines are shown representing the floor 100 if the dispensing assembly was in the prone position with contact between the floor 100 and the dispenser assembly 10 at a pivot surface 93 on a respective base member 16 and at the bumper surface 82 on the respective bumper member 80. If a dispensing assembly 10 of any one of FIGS. 13 to 15 is tipped about a front, rear or side surface of the base plate 16, the respective bumper surface 82 of the bumper member 80 will engage with the floor 100 before any other surfaces of the dispenser assembly 10.

As seen in FIGS. 14 and 15, the bumper members 80 are not and need not be symmetrical about the axis 22 to assist in providing protection to fluid dispenser 14.

Figure 18:
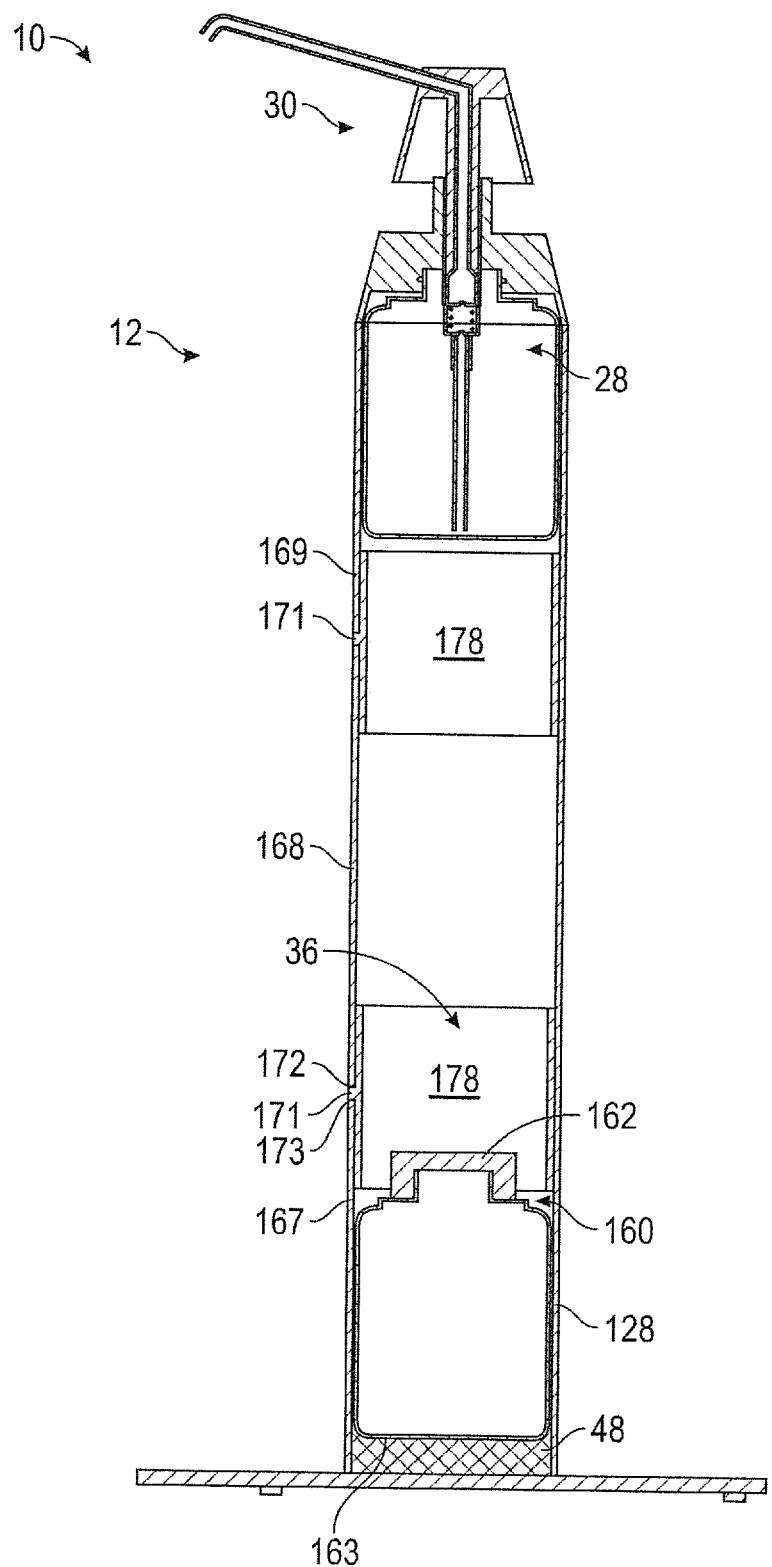
FIG. 18 is a rear cross-sectional view of a dispenser assembly in accordance with a seventh embodiment of the present invention.

Reference is made to FIG. 18 which illustrates a seventh embodiment of a support stand 12 and a dispenser assembly 10 in accordance with the present invention. In the seventh embodiment of FIG. 18, the pump 30 is removable from the reservoir 28 as, for example, by the piston chamber-forming element being threadably engaged in a sealed manner onto the neck of the reservoir 28. When the reservoir 28 coupled to the pump 30 is emptied of fluid, the entire fluid dispenser 14 is removed from the stand 12, the pump 30 is separated from the emptied reservoir 28, the pump 30 is then coupled to a new replacement reservoir and the fluid dispenser 14 with the new replacement reservoir is coupled to the support stand 12.

FIG. 18 illustrates an arrangement in which a replacement container 160 is provided stored within the interior cavity 36 of the pole member 18 axially below the reservoir 28. Replacement container 160 comprises a replacement reservoir 128 and a removable closure member 162 engaged on the replacement reservoir 128 closing the outlet 136 of the replacement reservoir 128. The replacement container 160 may be removed from storage within the pole member 18, coupled to the pump to form the fluid dispenser 14 to be coupled to the upper end of the pole member 18. As well, before the fluid dispenser 14 including the filled replacement reservoir 128 may be coupled to the pole member 18, the empty reservoir 28 may be stored within the pole member 18. Alternatively, the empty reservoir 28 may be filled as with water, the closure member 162 engaged on the reservoir 28 to seal it and the reservoir 28 filled with water placed into the bottom of the interior cavity 36 as ballast to resist tipping.

In FIG. 18, the base member 16 includes a pole mount member 48 with an upper surface 163 adapted to support the lower end of the replacement container.

FIG. 18 shows an arrangement in which the pole member 18 is formed from three separate elongate sections of the hollow tube member, namely, a first tube section 167, a second tube section 168 and a third tube section 169. Two coupling members 178 are shown, each as a tubular member sized to be of a diameter to be received within the open ends of adjacent of the tube sections 167, 168 and 169. Each coupling member 178 has a radially outwardly extending flange 171 with an upwardly directed upper surface 172 and a downwardly directed lower surface 173 to be engaged by axially directed end surfaces of the adjacent tube sections 167, 168 and 169. Providing the pole member 18 to be formed from one, two or more tube sections such as 167, 168 and 169 has the advantage of reducing the size of the support stand 12 for shipping and storage. With a number of similar modular tube sections provided, using but one or more of the tube sections permits providing for the height of the stand and/or fluid dispenser 14 to be at different heights above the floor 100 as to accommodate, for example, users of different heights such as children, adults and persons in wheelchairs.

Providing the pole member 18 to be formed from at least tube members 168 and 169 can facilitate access to the replacement container 160 stored within the pole member 18.

FIG. 18 illustrates features of storage of replacement elements within the pole member 18 and the use of one or more of a plurality of sections to form the pole member 18. Each of these features may be utilized independent of each other on the embodiment of FIG. 18 and in the other embodiments.

To gain access to the interior cavity 36 inside the pole member 18 for insertion and removal of the replacement container 160, the lower end of the pole member 18 may be removably coupled to the base member 16.

Figure 19:
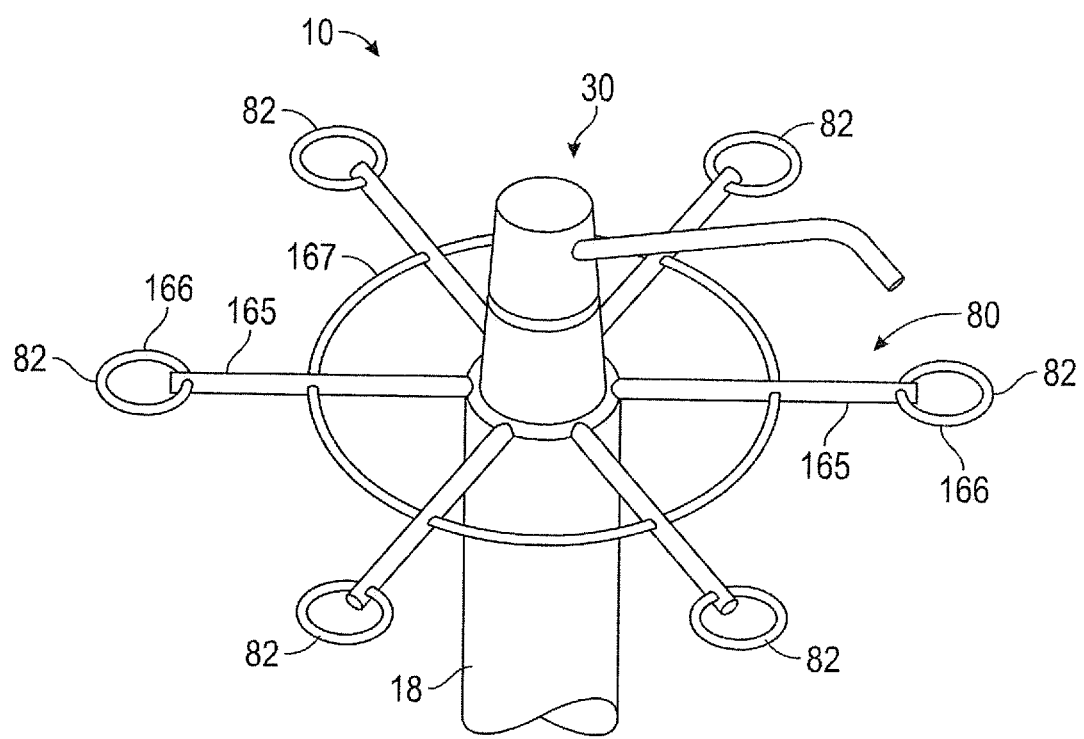
FIG. 19 shows a first alternate arrangement of a bumper member.

FIG. 19 shows an alternate configuration for a fall arrest bumper member 80 for use in replacement of the fall arrest bumper member 80 shown in FIGS. 6 to 10. The fall arrest bump member 80 in FIG. 18 similarly has a tubular sleeve portion 83 for engagement about the pole member 18 and the bumper member 80 extends radially outwardly relative the center axis to provide the bumper surface 82. FIG. 19 illustrates an arrangement in which a series of radially extending spokes 165 extend outwardly to discrete circular rings 166. The rings 166 preferably are resilient and on engagement with the floor assist in absorbing impact forces. An interior circumferential ring 167 may be provided to support the spokes 164.

The preferred embodiment of FIG. 4 illustrates an arrangement in which the fluid dispenser 14 other than the discharge tube 128 does not extend radially beyond the pole member 18. This is, however, not necessary. Another configuration which can be advantageous is to provide the piston chamber-forming body 116 to extend radially outwardly beyond the pole member 18 as, for example, shown in FIGS. 20 to 23.

Figure 20:
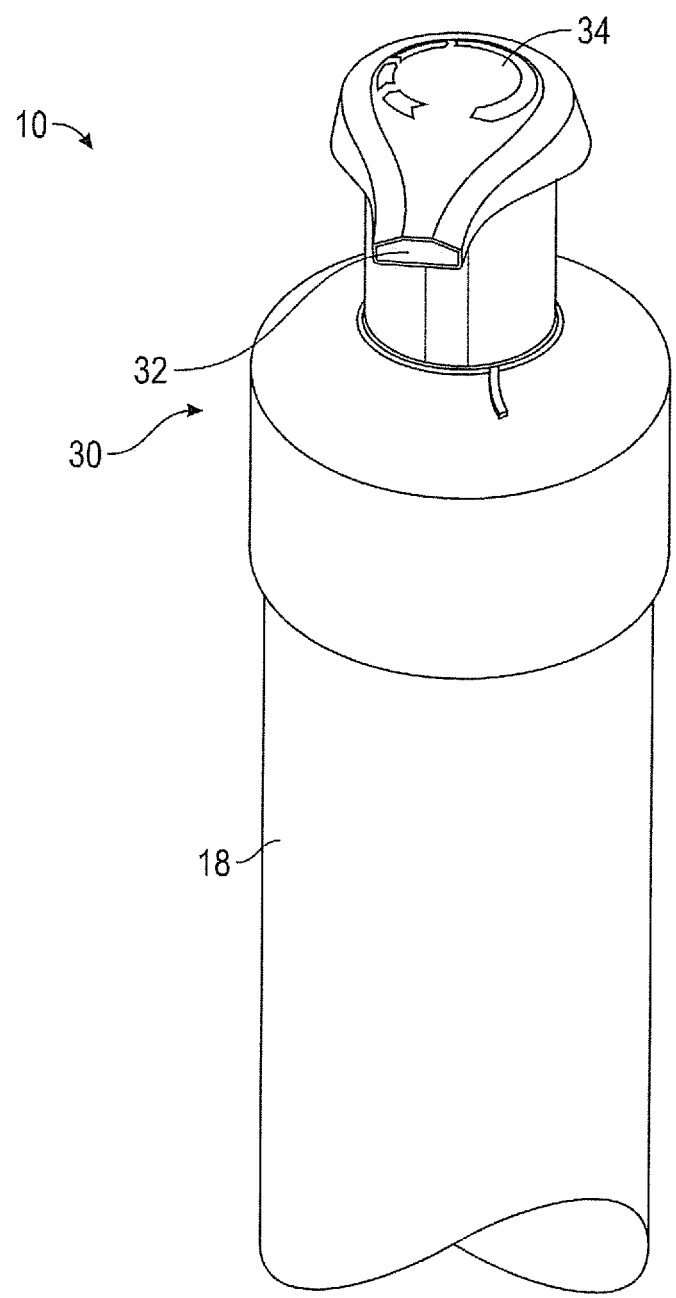
FIG. 20 is an enlarged pictorial view of an upper end of a dispenser assembly in accordance with an eighth embodiment of the invention.
Figure 21:
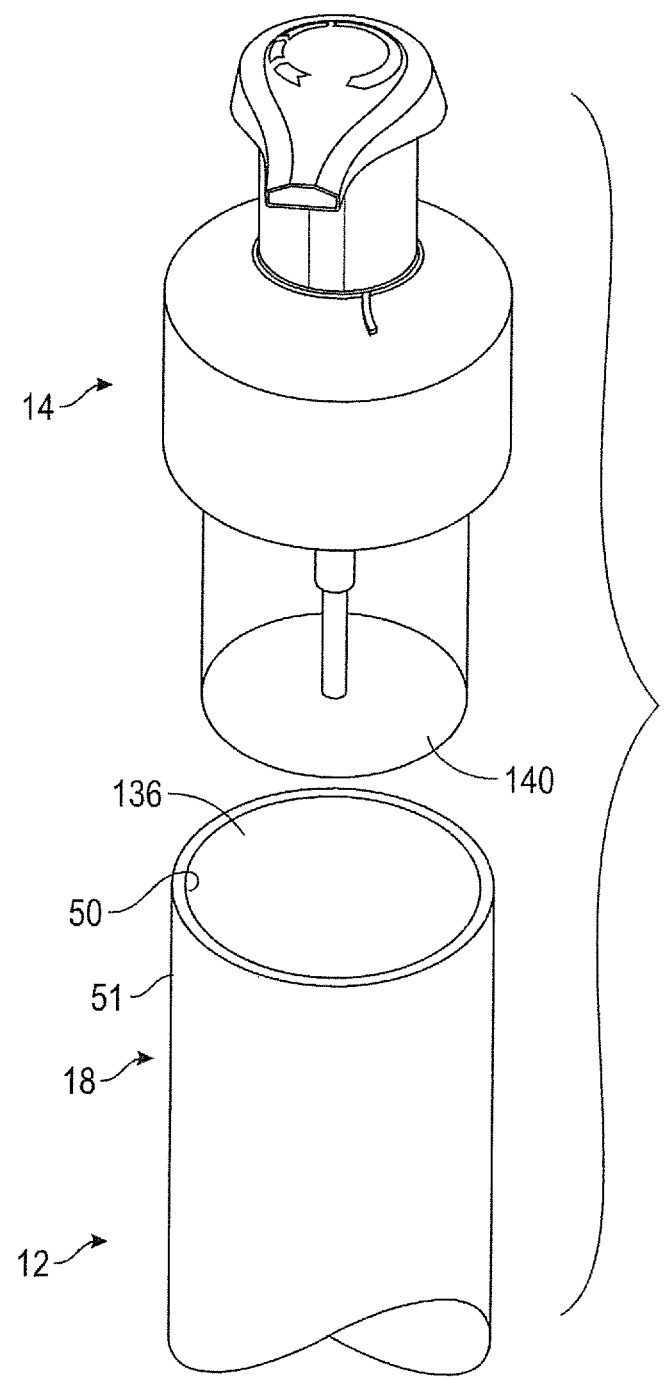
FIG. 21 is an exploded pictorial view of the dispenser assembly in FIG. 20.
Figure 22:
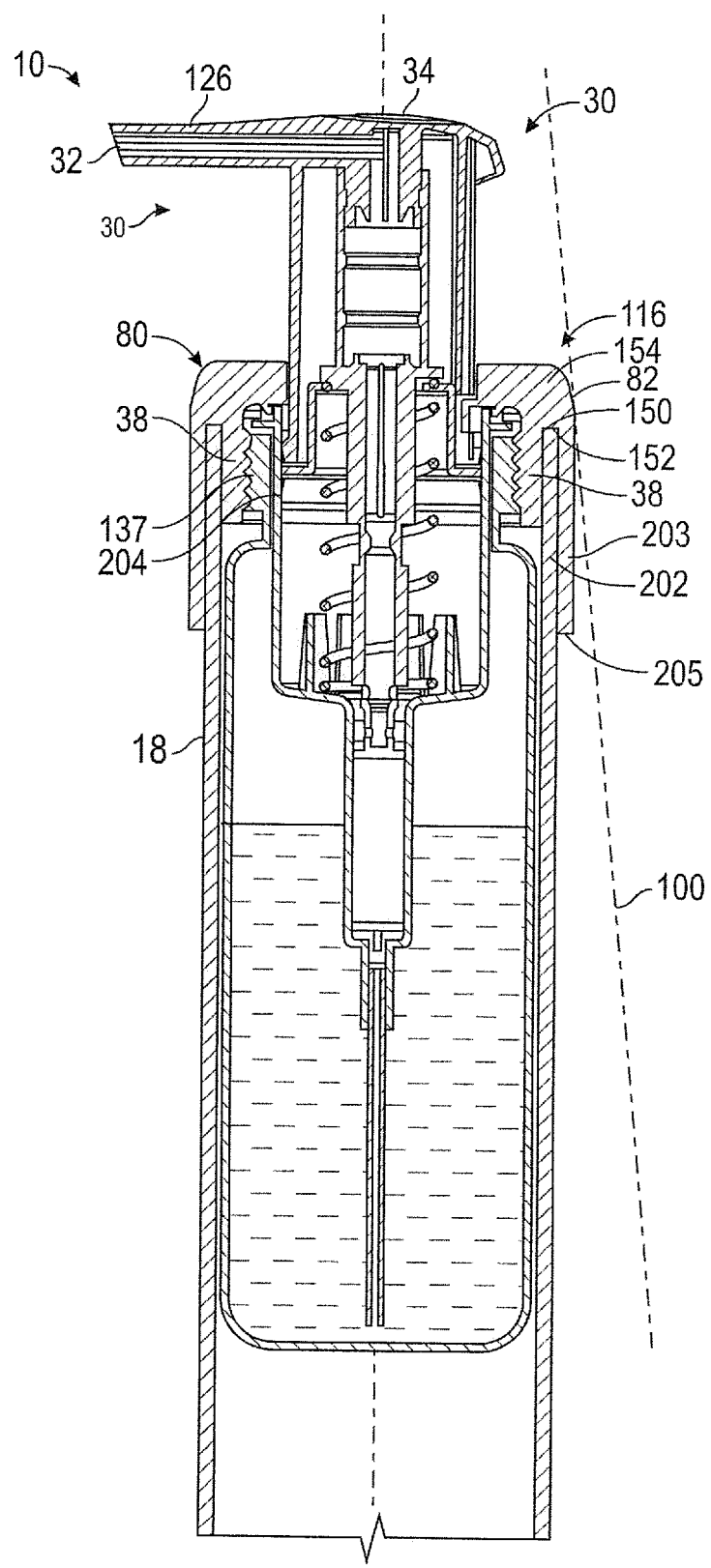
FIG. 22 is a vertical cross-sectional front view of the dispenser assembly of FIG. 20.

Reference is made to FIGS. 20 to 22 which shows an eighth embodiment of a dispenser assembly 10 in accordance with the present invention. The dispenser assembly 10 includes a stand 12 the same as that shown in the first embodiment of FIGS. 1 to 5 with a base member (not shown) and a pole member 18.

The pictorial exploded view of FIG. 21 shows the fluid dispenser 14 as a separate element which is adapted to have its reservoir 28 received in the interior cavity 36 of the pole member 18. The reservoir 28 of the fluid dispenser 14 is preferably relatively rigid provided with a bottom wall 140 such that the fluid dispenser 14 is adapted to support the fluid dispenser 14 as on the surface of a table for use separate from the stand 12 as by a user pushing the actuator 34 of the pump 30 downwardly.

The reservoir 28 has a neck 137 upstanding from the reservoir 28 and carrying external threads. The piston chamber-forming member 116 includes an inner annular collar 38 in having a radially inwardly directed surface carrying internal threads to engage the external threads on the neck 137 to secure the reservoir 28 to the piston chamber-forming member 116 in a sealed relationship to prevent fluid flow therebetween. The inner annular collar 38 extends axially downwardly to a lower distal end 204. The piston chamber-forming member 116 has an outer annular flange 203 that extends axially downwardly to a lower distal end 205 radially outwardly of the inner annular collar 38. An annular slotway 202 is provided radially between the inner annular collar 38 and outer annular flange 203 to receive the pole member 18 therein with an axially upwardly directed end surface 150 of the pole member 18 to be engaged with an axially downwardly directed support surface 152 provided on the piston chamber-forming member 116 to support the piston chamber-forming member 116 and thereby the pump 30 on the pole member 18.

In FIGS. 20 to 23, the piston chamber-forming body 116 is preferably coupled to the upper end 25 of the pole member 18 by frictional engagement between radially inwardly directed surfaces of the outer annular flange 203 on the piston chamber-forming body 116 and the radially outwardly directed surfaces 51 of the pole member 18, and/or by frictional engagement between radially outwardly directed surfaces of the inner annular collar 38 on the piston chamber-forming body 116 and the radially inwardly directed surfaces 50 of the pole member 18. Of course, various other arrangements including threaded or snap-fit arrangements, locking set screws and the like can be provided.

Referring to FIG. 22, a dashed straight line represents the location of the floor 100 should the dispenser assembly 10 be tipped to the prone position supported on the floor with the base member in engagement with the floor and the piston chamber-forming member 116 in engagement with the floor. As can be seen, should the dispenser assembly 10 of FIG. 20 be tipped, then aside from the discharge tube 126, the annular exterior surface 82 of the piston chamber-forming member 116 at the upper end of the tubular member 18 would contact the floor 100 and receive the impact forces without the dispenser assembly 10 other than possibly the discharge tube 126 contacting the floor 100. The piston chamber-forming body 116 would contact the floor and receive the impact forces. As is the case with the embodiment of FIGS. 11 and 12, the discharge tube 126 is free to rotate about the axis 22 and insofar as the discharge tube 126 might in the tipping come to engage the floor 100, then the discharge tube 126 would rotate about the axis 22. In the embodiment of FIGS. 20 to 22, the piston chamber-forming body 116 forms a fall arrest bumper member 80 and the radially outwardly directed surface of the outer annular flange 203 of piston chamber-forming body forms the bumper surface 82. The piston chamber-forming body 116 may be provided such that its annular exterior surface 82 forming the bumper surface is resilient. The piston chamber-forming body 116 in forming the bumper member 80 preferably is at least be provided as a body with sufficient strength that on receiving of the impact forces, the piston chamber-forming body 116 would not break or fracture but rather would serve as an impact receiving point as to transfer the forces to other components such as to the pole member 18 and bottle without damage to the dispenser assembly 10 such that preferably the dispenser assembly 10 and its fluid dispenser 14 would operate when inverted to the upright position.

Figure 23:
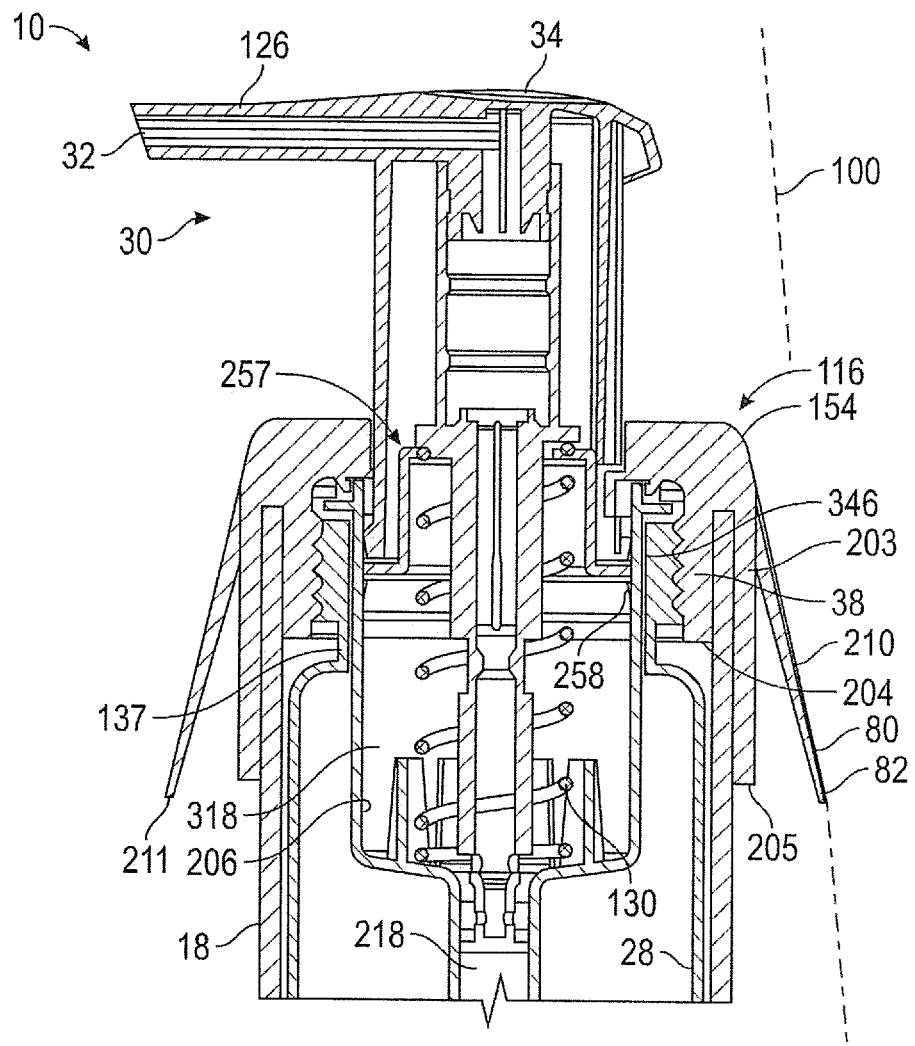
FIG. 23 is vertical cross-sectional front view of an upper end of a dispenser assembly in accordance with a ninth embodiment of the present invention.

Reference is made to FIG. 23 which shows a ninth embodiment of a dispenser assembly 10 in accordance with the present invention which is identical to the eighth embodiment of FIGS. 20 to 22 but for the addition axially outwardly of the outer annular flange 203 of an axially extending outer annular collar 210 that extends from the piston chamber-forming body 116 to a distal end 211 radially outwardly from the outer annular flange 203. The outer annular collar 210 is preferably formed to be resilient such that it will serve as the bumper member 80 with a bumper surface 82 and resiliently deflect radially inwardly during an impact with the floor 100.

As shown on FIG. 23, the piston chamber-forming body 116 includes the collar member 38 that sealably engages on the neck of the reservoir 28 against fluid flow therebetween. The piston chamber-forming body 116 includes a tube member 239 that has an upper end sealably engaged with the collar member 39 against fluid flow therebetween. The tube member 38 defines an air chamber 318 and a liquid chamber 218 coaxially below the air chamber 318. The piston-forming element 114 is coaxially reciprocally slidable relative a piston chamber-forming member 116 in selective engagement with a cylindrical wall 206 of the air chamber 318 and a cylindrical wall of the liquid chamber 218 to form an air pump and a liquid pump. The piston-forming element 114 carries an air disc 257 whose outer end 258 slidably engages the radially inner surface of the cylindrical wall 206 of the air chamber 318 preventing flow therebetween.

An air port 346 is provided radially through the wall 206 of the air chamber 318. The air port 346 is open on a radial inward side of the tube member 239 into the air chamber 318. The air port 346 is open on a radial outward side of the tube member 239 into the interior of the reservoir 28 via an annular passageway between the tube member 239 and the neck of the reservoir 28. When the piston-forming element 114 is in the extended position as seen in FIG. 23, the outer end 256 of the air disc 257 overlies the air port 246 preventing air flow through the air port 246. The piston-forming element 114 is biased to the extended position relative the piston chamber-forming body 116 by a spring 130. Thus, in any position of the dispenser assembly 10, the fluid 29 will not flow out of the fluid dispenser of FIG. 23, unless the pump 30 is operated. Particularly, when the dispenser assembly 10 is in the prone position, the fluid dispenser 14 and its pump 30 are configured such that the fluid does not flow out of the fluid dispenser 14 unless the pump 30 is operated. This is advantageous such that on the dispenser assembly 10 being tipped to the prone position, it is preferred that the fluid in the reservoir 28 not flow out of the dispenser assembly 10.

A fluid dispenser 14 and/or pump 30 as shown in FIG. 23 or having features of the pump to stop fluid flow when the dispenser assembly 10 is in the prone position, may be used in each of the other embodiments of the invention as to prevent fluid flow. Other arrangements of pumps may be used to stop fluid flow in the prone position. For example, the fluid dispenser can be configured so that the fluid dispenser does not operate to discharge fluid when the dispenser is in the prone position, or configured that the fluid dispenser does not operate to discharge fluid when the dispenser is not in the upright position or configured so that the fluid does not flow out of the fluid dispenser when the fluid dispenser is not in the upright position unless the pump is operated.

The pump 30 in FIGS. 20 to 23 has a construction the same as that disclosed in US Patent Publication US 2018/0015489, the disclosure of which is incorporated herein by reference, with the exception of the configuration of the collar 38 about the piston chamber-forming member 116. The pump 30 of FIGS. 20 to 23 is adapted to simultaneously discharge the fluid 29 from the reservoir 28 and air from the atmosphere mixed together preferably as a foam of liquid and air through the discharge tube 126 to out the discharge outlet 32.

Some of the embodiments show the use of a manually operated pump 30 and other embodiments, such as in FIGS. 13 to 15, show fluid dispensers that are preferably touchless and an electrically operated pump 30 is used. In each of the embodiments, either manually operated or electrically powered pumps may be used.

In accordance with the present invention, the free standing support stand 12 may be provided so it is a separate element of commerce and various fluid dispensers 14 or other fragile devices may be provided separately for use with the stand 12. In a preferred use of the support stand 12, a separate fluid dispenser 14 is coupled to the support stand 12 as seen, for example, in each of FIGS. 1, 6, 11, 13, 14, 15, 18, 19, 20 and 23. The invention thus provides, on one hand, a commercial product of a support stand for use with a fragile device preferably a fluid dispenser and, on the other hand, a dispenser assembly 10 including a combination of the support stand 12 and a fluid dispenser 14. The fluid dispenser 14 is preferably removable from the support stand 12 for replacement by a replacement fluid dispenser 14, preferably having a configuration the same as or similar to that of the replaced fluid dispenser 14. Preferably, for sanitary purposes, the pump 30 is preferably not removable from the reservoir 28 or is only removable in a manner that on removal prevents reuse of the pump 30 and the reservoir 28. With such an arrangement, preferably when the reservoir 28 is emptied of fluid, a new fluid dispenser 14 needs to be provided.

The separate free standing stand 12 may optionally include a bumper member 80 as seen in each of FIGS. 6, 11, 13, 14, 19, 20 and 23, although a bumper member is not necessary. In accordance with the present invention, when the stand 12 is provided in combination with a fluid dispenser 12, then a free standing dispenser assembly is provided as seen, for example, in FIGS. 1, 6, 11, 13, 14, 15, 18, 19, 20 and 23. The free standing dispenser assembly preferably includes one or more of a bumper member 80 and a drip tray 88, although neither or both are required. In accordance with the present invention, the free standing dispenser assembly 10 may have at least portions of the fluid dispenser 12 received with an interior cavity at the upper end of a pole member of the stand, and with or without either or both of a bumper member or a drip tray.

Various embodiments of the free standing dispenser assembly 10 in accordance with the present invention which include a bumper member 80 as, for example, in each of FIGS. 6, 11, 13, 14, 15, 19, 20, 22 and 23 and in which bumper member 80 is configured such that when the dispenser assembly 10 is tipped from the upright position toward a prone position such as in FIG. 10 with pivot surfaces 93 of the stand 12 remaining engaged with the floor 100, the bumper surface 82 of the bumper member 80 will engage the floor 100.

Some of these embodiments such as in FIGS. 13, 14, 15, and 19 are configured such that when the dispenser assembly 10 is tipped from the upright position toward a prone position such as in FIG. 10 with pivot surfaces 93 of the stand 12 remaining engaged with the floor 100, the bumper surface 82 of the bumper member 80 is the only surface other than the pivot surfaces 93 that will come to engage the floor 100 since when in the prone position none of the other surfaces extend.

In other of these embodiments such as in FIGS. 6, 11, 20, 22 and 23, the discharge outlet 32 as on the discharge tube 126 in FIG. 11, extends radially beyond the bumper member 80 and when the dispenser assembly 10 is tipped from the upright position toward a prone position such as in FIG. 10 with pivot surfaces 93 of the stand 12 remaining engaged with the floor 100, the bumper surface 82 of the bumper member 80 will come to engage the floor 100 and surfaces of the discharge tube 126 might, if the discharge tube 126 is rotated to particular locations opposed to the floor 100, also come to engage with the floor 100. Preferably, in each of FIGS. 6, 11, 20, 22 and 23 the discharge tube 126 is mounted to the fluid dispenser 14 for rotation about an axis parallel the vertical axis 22 such that if in tipping toward the prone position, there might arise engagement between the discharge tube 126 and the floor 100, then the discharge tube 126 will rotate about the axis 22 preferably preventing transfer of impact forces to the dispenser assembly 10 via the discharge tube 126.

In each of the embodiments, the free standing dispenser assembly 10 may be considered to have surfaces including the pivot surfaces 93 and the bumper surface 82 as well as other surfaces. In many of the embodiments, the bumper member 80 is configured such that when the dispenser assembly 10 is tipped from the upright position toward a prone position such as in FIG. 10 with pivot surfaces 93 of the stand 12 remaining engaged with the floor 100, the bumper surface 82 of the bumper member 80 will engage the floor 100 before the other surfaces of the dispenser assembly 10 come to engage the floor 100. In some embodiments in which the discharge tube 126 extends radially beyond the bumper member 80, the other surfaces are to be interpreted to not include surfaces of the discharge tube 126 and the bumper member 80 is configured such that when the dispenser assembly 10 is tipped from the upright position toward a prone position such as in FIG. 10 with pivot surfaces 93 of the stand 12 remaining engaged with the floor 100, the bumper surface 82 of the bumper member 80 will engage the floor 100, and if surfaces of the discharge tube 126 engage the floor 100, then such engagement results in rotation of the discharge tube 126 about the axis parallel the axis 22.

While the invention has been described with reference to preferred embodiments, many modifications and variations will now occur to those skilled in the art. For a definition of the invention, reference is made to the following claims.

We claim:

1. A free standing stand comprising:
a support stand adapted to be supported on a horizontal floor,
the stand having an upper end and a lower end,
the stand having at the lower end floor engaging surfaces to engage the floor,
wherein with the floor engaging surfaces engaging the floor, the stand is supported in a free standing upright position on the floor with the stand extending upwardly about a vertical axis from the lower end to the upper end,
the stand including a coupling member adapted to couple a fragile element to the stand spaced from the lower end of the stand,
the stand including a fall arrest bumper member spaced upwardly from the lower end toward the upper end,
the fall arrest bumper member having a radially outwardly directed bumper surface located radially outwardly from vertical axis,
the lower end of the stand having pivot surfaces about which the stand, when in the upright position will, if sufficient lateral forces are applied to the stand spaced upwardly from the lower end of the stand, pivot engaged with the floor, tipping the stand from the upright position to a tipped prone position in which the stand is supported on the floor by engagement between the floor and both the pivot surfaces and the bumper surface,
the bumper surface provided at circumferential locations about the axis, axially spaced from the lower end of the stand and radially outwardly from the axis such that when the stand with the fragile element coupled to the stand by the coupling member is tipped in any radial direction relative the axis from the upright position toward the prone position with the pivot surfaces remaining engaged with the floor, the bumper surface will engage with the floor before other surfaces of the stand and the fragile element will come to engage the floor,
the fall arrest bumper member is resiliently deflectable for movement radially inwardly toward the axis from an inherent position to deflected positions, and when deflected from the inherent position to deflected positions returning to the inherent position under an inherent bias.

2. The free standing stand as claimed in claim 1 wherein the fall arrest bumper member is an annular member about the axis with a circumferential radially outwardly directed outer edge comprising the bumper surface.

3. The free standing stand as claimed in claim 2 wherein the outer edge of the annular member of the fall arrest bumper member is circular about the axis.

4. The free standing stand as claimed in claim 3 wherein the fragile element comprises a fluid dispenser for discharging a fluid from a discharge outlet spaced upwardly from the lower end of the stand.

5. The free standing stand as claimed in claim 2 wherein the fragile element comprises a fluid dispenser for discharging a fluid from a discharge outlet spaced upwardly from the lower end of the stand.

6. The free standing stand as claimed in claim 2 wherein the stand having at the lower end a base member carrying the floor engaging surfaces and the pivot surfaces, and
the base member is an annular member about the axis with a circumferential radially outwardly directed outer edge comprising the pivot surfaces.

7. A free standing stand as claimed in claim 1 wherein the stand having at the lower end a base member carrying the floor engaging surfaces and the pivot surfaces, and
the base member is an annular member about the axis with a circumferential radially outwardly directed outer edge comprising the pivot surfaces.

8. The free standing stand as claimed in claim 7 wherein the outer edge of the base member is circular about the axis.

9. The free standing stand as claimed in claim 1 wherein the fragile element comprises a fluid dispenser for discharging a fluid from a discharge outlet spaced upwardly from the lower end of the stand.

10. The free standing stand as claimed in claim 9 wherein;
the fluid dispenser includes a discharge tube extending radially outwardly relative the axis to the discharge outlet,
the discharge tube mounted to the fluid dispenser for rotation about an axis parallel the vertical axis,
the other surfaces of the fluid dispenser and the fragile element do not include surfaces of the discharge tube, and
wherein when the stand with the fluid dispenser coupled to the stand by the coupling member is tipped in any radial direction relative the axis from the upright position toward the prone position with the pivot surfaces remaining engaged with the floor and the bumper surface engaging with the floor, if surfaces of the discharge tube engages the floor such engagement results in the rotation of the discharge tube about the axis parallel the vertical axis.

11. The free standing stand as claimed in claim 9 wherein the fluid dispenser includes a reservoir for the fluid to be dispensed, and a pump to dispense the fluid from the reservoir out of the discharge outlet.

12. The free standing stand as claimed in claim 11 wherein the stand includes a pole member disposed about the axis,
the pole member having a lower end and an upper end,
the pole member providing a hollow interior cavity about the axis open at an upper access opening at the upper end of the pole member,
the fluid dispenser coupled to the upper end of the pole member extending from within the interior cavity outwardly through the access opening,
the reservoir having an upper end and a lower end,
the fluid dispenser coupled to the stand with the coupling member with the upper end of the pole member with the upper end of the reservoir above the lower end of the reservoir and the lower end of the reservoir disposed within the interior cavity.

13. The free standing stand as claimed in claim 12 wherein the fluid dispenser when coupled to the stand with the coupling member is removably engaged to the pole member with at least the reservoir extending axially downwardly through the upper access opening of the pole member into the interior cavity, and the pump coupled to the upper end of the reservoir above the reservoir presenting exterior of the interior cavity, and the discharge outlet accessible for a hand of a user to receive fluid discharged from the discharge outlet.

14. The free standing stand as claimed in claim 12 wherein the pump having an actuator for engagement by the user to activate the pump to dispense the fluid, and wherein when the fluid dispenser is coupled to the stand with the coupling member the pump is coupled to the upper end of the reservoir above the reservoir presenting exterior of the interior cavity, (a) the actuator accessible for engagement by the user to activate the pump to discharge the fluid, and (b) the discharge outlet accessible for the hand of the user to receive the fluid discharged from the discharge outlet.

15. The free standing stand as claimed in claim 9 wherein the stand includes a drip tray located below the discharge outlet when the fluid dispenser is coupled to the stand by the coupling member with a vertically extending hand space provided between the discharge outlet and the drip tray within which a person's hand may be placed to receive the fluid dispensed from the discharge outlet.

16. The free standing stand as claimed in claim 15 wherein the fall arrest bumper member carries the drip tray.

17. The free standing stand as claimed in claim 15 wherein the drip tray is an annular member about the axis with a circumferential radially outwardly directed outer edge comprising the bumper surface.

18. The free standing stand as claimed in claim 17 wherein the outer edge of the annular member is circular about the axis.

19. The free standing stand as claimed in claim 17 wherein the fluid dispenser includes a drip tray located below the discharge outlet, with a vertically extending hand space provided between the discharge outlet and the drip tray within which the hand of the user may be placed to receive the fluid dispensed from the discharge outlet, and the drip tray is an annular tray member about the axis with a circumferential radially outwardly directed outer edge comprising the bumper surface.

20. The free standing stand as claimed in claim 9 wherein the stand includes a pole member disposed about the axis,
- the pole member having a lower end and an upper end,
- the pole member providing a hollow interior cavity about the axis open at an upper access opening at the upper end of the pole member,
- the fluid dispenser coupled to the stand with the coupling member with upper end of the pole member extending from within the interior cavity outwardly through the access opening.

\* \* \* \* \*